United States Patent
Karaki et al.

(10) Patent No.: US 10,451,111 B2
(45) Date of Patent: Oct. 22, 2019

(54) THERMOSETTING RESIN COMPOSITION, SLIDING MEMBER AND METHOD FOR PRODUCING SLIDING MEMBER

(71) Applicant: MINEBEA MITSUMI INC., Kitasaku-gun, Nagano (JP)

(72) Inventors: Tadahiko Karaki, Tomi (JP); Aya Kakegawa, Saku (JP); Koichiro Sagiyama, Chiba (JP)

(73) Assignee: MINEBEA MITSUMI INC., Nagano (JP)

( * ) Notice: Subject to any disclaimer, the term of this patent is extended or adjusted under 35 U.S.C. 154(b) by 742 days.

(21) Appl. No.: 15/009,160

(22) Filed: Jan. 28, 2016

(65) Prior Publication Data

US 2016/0160920 A1 Jun. 9, 2016

Related U.S. Application Data

(63) Continuation of application No. PCT/JP2014/070255, filed on Jul. 31, 2014.

(30) Foreign Application Priority Data

Jul. 31, 2013 (JP) .................................. 2013-159874

(51) Int. Cl.
*F16C 33/20* (2006.01)
*F16C 33/10* (2006.01)
(Continued)

(52) U.S. Cl.
CPC ........ *F16C 33/201* (2013.01); *C08G 59/3236* (2013.01); *C08G 59/4028* (2013.01);
(Continued)

(58) Field of Classification Search
CPC ............ C10M 133/42; C10M 169/044; C10M 133/44; C10M 169/04; C10M 133/24;
(Continued)

(56) References Cited

U.S. PATENT DOCUMENTS

| 6,180,574 B1 | 1/2001 | Ryan et al. |
| 2004/0058828 A1 | 3/2004 | Iwata et al. |

(Continued)

FOREIGN PATENT DOCUMENTS

| CN | 1 238 363 A | 12/1999 |
| CN | 1077909 C | 1/2002 |

(Continued)

OTHER PUBLICATIONS

Aug. 26, 2014 Search Report issued in International Patent Application No. PCT/JP2014/070255.
(Continued)

*Primary Examiner* — Taiwo Oladapo
(74) *Attorney, Agent, or Firm* — Pearne & Gordon LLP

(57) ABSTRACT

A thermosetting resin composition includes an epoxy compound having an isocyanuric acid ring represented by the following formula (1), and a solid lubricant.

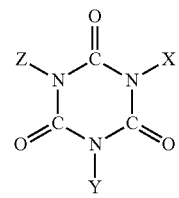

(1)

18 Claims, 4 Drawing Sheets

(51) Int. Cl.
| | |
|---|---|
| *C10M 107/42* | (2006.01) |
| *C10M 107/44* | (2006.01) |
| *F16C 23/04* | (2006.01) |
| *C08G 59/32* | (2006.01) |
| *C08G 59/40* | (2006.01) |
| *C09D 163/06* | (2006.01) |
| *C08K 5/3492* | (2006.01) |
| *C08K 7/14* | (2006.01) |
| *C08L 27/18* | (2006.01) |
| *C08L 71/00* | (2006.01) |

(52) U.S. Cl.
CPC ............ *C08K 5/3492* (2013.01); *C08K 7/14* (2013.01); *C08L 27/18* (2013.01); *C08L 71/00* (2013.01); *C09D 163/06* (2013.01); *C10M 107/42* (2013.01); *C10M 107/44* (2013.01); *F16C 23/045* (2013.01); *F16C 33/1095* (2013.01); *C08G 2650/40* (2013.01); *F16C 2208/86* (2013.01)

(58) Field of Classification Search
CPC . C10M 107/38; C10M 145/20; C08K 5/3492; C08K 5/20; C09D 163/06; C09J 175/04; C08L 63/06; C08L 71/00; C08L 27/18; C08G 2650/40; C08G 2101/00; C08G 59/3236; C08G 59/4028; C08G 59/4042; C08G 18/58; F16C 2208/86; F16C 2220/70; F16C 33/1095; F16C 33/201
See application file for complete search history.

(56) References Cited

U.S. PATENT DOCUMENTS

| | | |
|---|---|---|
| 2007/0223850 A1 | 9/2007 | Lopes et al. |
| 2010/0137475 A1 | 6/2010 | Takeyama et al. |
| 2010/0273686 A1 | 10/2010 | Nakabayashi |
| 2011/0262059 A1 | 10/2011 | Karaki et al. |
| 2014/0083567 A1* | 3/2014 | Hamagawa ............. C22C 12/00 148/24 |
| 2014/0169713 A1 | 6/2014 | Karaki et al. |

FOREIGN PATENT DOCUMENTS

| | | |
|---|---|---|
| CN | 102 390 139 A | 3/2012 |
| CN | 102390139 A * | 3/2012 |
| EP | 2 842 970 A1 | 3/2015 |
| JP | S55-135163 A | 10/1980 |
| JP | H06-253389 A | 9/1994 |
| JP | 2007-009200 A | 1/2007 |
| JP | 2007-255712 A | 10/2007 |
| JP | 2008-081723 A | 4/2008 |
| JP | 2010-241952 A | 10/2010 |
| JP | 2011-247408 A | 12/2011 |
| JP | 2013-023554 A | 2/2013 |
| WO | 2009/008509 A1 | 1/2009 |
| WO | WO-2012160722 A1 * | 11/2012 ............. C22C 12/00 |

OTHER PUBLICATIONS

Aug. 26, 2014 Written Opinion issued in International Patent Application No. PCT/JP2014/070255.
Feb. 9, 2017 Extended Search Report issued in European Patent Application No. 14832161.5.
Jun. 28, 2016 Office Action issued in Japanese Patent Application No. 2015-528622.

* cited by examiner

THERMOSETTING RESIN COMPOSITION, SLIDING MEMBER AND METHOD FOR PRODUCING SLIDING MEMBER

CROSS REFERENCE TO RELATED APPLICATION

This application is a Continuation application of International Application No. PCT/JP2014/070255 which was filed on Jul. 31, 2014 claiming the conventional priority of Japanese patent Application No. 2013-159874 filed on Jul. 31, 2013.

BACKGROUND OF THE INVENTION

Field of the Invention

The present invention relates to a thermosetting (thermo-curable) resin composition for forming a self-lubricating liner of a sliding member such as an unlubricated sliding bearing and a reamer bolt, a sliding member provided with the self-lubricating liner, and a method for producing the sliding member.

Description of the Related Art

A sliding bearing in which a shaft of rotary motion or translational motion is held by a sliding surface has been widely used. In particular, an unlubricated sliding bearing using no lubricating oil for a sliding surface has been used for applications requiring low friction coefficient, high durability, high load capacity, high heat resistance, high oil resistance, and the like, such as vessel or ship application and aircraft application.

As such an unlubricated sliding bearing, Patent Literature 1 (Japanese Patent Application Laid-open No. 2007-255712 corresponding to United States Patent Application Publication No. 2007/223850) discloses a spherical bearing for high-load application including an outer race member having a concave first bearing surface and an inner race member having a convex second bearing surface slidably movable relative to the first bearing surface. In the spherical bearing, one of the outer race member and the inner race member is made of titanium alloy which has a bearing surface made of titanium nitride and formed on the titanium alloy surface by a physical vapor deposition method (PVD). The bearing surface of the other member includes a self-lubricating liner made from resin. The self-lubricating liner is composed of a fabric including fibers of polytetrafluoroethylene (PTFE) and polyaramid. The fabric is saturated with a phenol resin composition.

Patent Literature 2 (U.S. Pat. No. 6,180,574) discloses a self-lubricating coating composed of a thermosetting acrylic composition in which dipentaerythritol pentaacrylate is contained in an amount of 20% by weight or more and a solid lubricant such as polytetrafluoroethylene is contained in an amount of 10% by weight or more. Patent Literature 2 discloses that 20% by weight or more of triethylene glycol dimethacrylate and 1% by weight or less of aramid pulp may be added to the self-lubricating coating. Patent Literature 2 also discloses a sleeve bearing in which the self-lubricating coating is applied, as a liner, on the inner circumferential surface of an outer race.

Patent Literature 3 (Japanese Patent Application Laid-open No. 2011-247408 corresponding to United States Patent Application Publications No. 2011/262059 and No. 2014/169713) by the applicant of the present application discloses a sliding bearing suitable for the aircraft application and the like. The sliding bearing includes a self-lubricating liner formed on a sliding surface of the sliding bearing, and the self-lubricating liner is composed of a self-lubricating resin composition obtained by mixing 60% by weight to 80% by weight of polyether ketone resin, 10% by weight to 30% by weight of PTFE, 5% by weight to 15% by weight of carbon fiber, and 15% by weight or less of aramid fiber. The total content amount of the carbon fiber and the aramid fiber is 10% by weight to 25% by weight. A metal surface on which the self-lubricating liner is formed has a surface roughness Ra (average centerline roughness) of 4.0 µm or more and an Rmax (maximum height) of 30.0 µm or more.

Further, Patent Literature 4 (Japanese Patent Application Laid-open No. 2013-23554) discloses a thermosetting epoxy resin composition for a fiber-reinforced composite material capable of obtaining a cured product which not only has high heat resistance and high mechanical strength, but which is also excellent in impact resistance. The resin composition discloses in Patent Literature 4 includes: an alicyclic epoxy compound; a monoallyldiglycidyl isocyanurate compound; a curing agent; and a cure accelerator. Since a cured product obtained from the resin composition is excellent in heat resistance, mechanical strength and impact resistance, the cured product can be suitably used in structures such as fuselage, main wing, tail assembly, rotor blade, fairing, cowl and door of an aircraft; motor case and main wing of a spacecraft; body structure of an artificial satellite; automobile parts such as chassis of an automobile; body structure of railway carriage; body structure of a bicycle; body structure of a ship; blade for wind power generation; pressure vessel; fishing rod; tennis racket; golf shaft; robot arm; cable; and the like.

Since the unlubricated sliding bearings disclosed in Patent Literatures 1 to 3 are used by being incorporated into an aircraft and the like, the unlubricated sliding bearings are required to have low friction coefficient, high load capacity, heat resistance, oil resistance, and the like as described above. Further, from the side of airframe manufacturers, there is such a demand that in a step of assembling a sliding bearing such as a sleeve bearing, the manufactures wish to perform fitting adjustment through cutting or grinding of a sliding surface of the sliding bearing instead of performing a size adjustment on a shaft.

However, in the case of the fibrous lubricating liner described in Patent Literature 1, it is not possible to perform the size adjustment through the grinding or the cutting because, if it is subjected to such an after-processing, the fibers of the lubricating liner will be cut and the lubricating liner will not function as a liner any longer.

On the other hand, the self-lubricating coating based on thermosetting acrylic resin and described in Patent Literature 2 has wear resistance and friction coefficient under a high temperature which are not sufficient to be used by being incorporated into the aircraft and the like. There is a demand for a self-lubricating coating having higher wear resistance and lower friction coefficient under a high temperature. Further, when the size adjustment is performed through grinding or cutting the sliding surface of the sliding bearing, it is preferable that the thickness of the self-lubricating coating is thick so that the size adjustment can be performed in a wide range. However, in such a case that a thermosetting acrylic resin subjected to a relatively large thermal contraction (thermal shrinkage) during the thermo-curing process is used to form a thick self-lubricating coating, it is possible to occur a film separation, a film cracking, or the like.

Although the thermosetting epoxy resin composition disclosed in Patent Literature 4 has high heat resistance, this thermosetting epoxy resin composition is aimed to make the structures such as the fuselage, main wing and the like of an aircraft. Accordingly, it is not possible to apply the thermosetting epoxy resin composition as it is to a self-lubricating liner for the sliding bearing which is required to have various properties such as the sliding property, low friction coefficient, high load capacity, high oil resistance, and the like.

The self-lubricating liner described in Patent Literature 3 is based on the polyether ketone resin which is thermoplastic resin, and thus the self-lubricating liner can be produced by an injection molding method achieving high productivity. However, in order to improve the adhesion of the liner to the inner circumferential surface of the outer race, it is required that a shot blasting process for increasing the surface roughness of the inner circumferential surface of the outer race be performed beforehand. Further, in a case that PTFE is blended as a solid lubricant with the thermoplastic resin such as the polyether ketone resin, PTFE is required to be blended in an amount of less than 30% by weight, due to the following reason. During the kneading of resin and the injection molding, PTFE generates decomposition gas because it is heated to above its melting point by being exposed to high temperature and high pressure. From the viewpoint of safety, the generation of such decomposition gas should be prevented. Accordingly, the addition amount of PTFE should be limited. On the other hand, in order to improve the lubricating property of the liner, it is desirable that the addition amount of PTFE be increased.

Under the above circumstances, there is a demand for a resin composition for a self-lubricating liner which can ensure a sufficient addition amount of PTFE, can be handled easily during manufacturing steps, and requires no process for roughening the base surface.

The present teaching has been conceived to solve the foregoing problems. An object of the present teaching is to provide a resin composition for forming a self-lubricating liner which has low friction coefficient, high durability, high load capacity, high heat resistance and high oil resistance, as well as which can be subjected to a size adjustment through grinding or cutting after being cured, and which requires no process for roughening the base surface, and also to provide a resin composition which can be handled easily in manufacturing steps. Another object of the present teaching is to provide a sliding member with the self-lubricating liner composed of the resin composition.

SUMMARY OF INTENTION

According to a first aspect related to the present teaching, there is provided a thermosetting resin composition including:

an epoxy compound having an isocyanuric acid ring represented by the following formula (1):

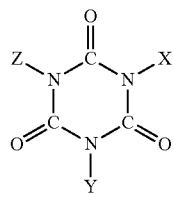

(1)

in the formula (1), at least one of X, Y and Z is a group containing an epoxy ring, and when X, Y or Z contains no epoxy ring, X, Y or Z containing no epoxy ring is an atom of H, a group composed only of C and H, or a group composed only of C, H, and O;

and a solid lubricant.

According to the first aspect of the present teaching, the solid lubricant may be contained in an amount of 10% by weight to 70% by weight with respect to the entire amount of the thermosetting resin composition. Further, the solid lubricant may contain polytetrafluoroethylene; and the polytetrafluoroethylene may be contained in an amount of 10% by weight to 70% by weight with respect to the entire amount of the thermosetting resin composition. The thermosetting resin composition may further contain a curing agent, wherein a weight ratio (M/N) of a weight (M) of the curing agent to a weight (N) of the epoxy compound having the isocyanuric acid ring may be in a range of (M/N)=0.65 to 1.65.

In the first aspect of the present teaching, the epoxy compound having the isocyanuric acid ring may be a mixture of an epoxy compound in which all of the X, Y and Z in the formula (1) are each the group containing the epoxy ring, an epoxy compound in which two of the X, Y and Z in the formula (1) are each the group containing the epoxy ring, and an epoxy compound in which one of the X, Y and Z in the formula (1) is the group containing the epoxy ring.

The epoxy compound having the isocyanuric acid ring may be at least one selected from the group consisting of: 1,3,5-tris(2,3-epoxypropyl)-1,3,5-triazine-2,4,6(1H,3H, 5H)-trione; an addition reaction product of 1,3,5-tris(2,3-epoxypropyl)-1,3,5-triazine-2,4,6(1H,3H,5H)-trione and propionic acid anhydride; 1-methyl-3,5-bis-oxiranyl methyl-[1,3,5]triazine-2,4,6-trione; acrylic acid 2-(3,5-bis-oxiranyl methyl-2,4,6-trioxo-[1,3,5]triazine-1-yl)ethyl ester; and 2-methyl-acrylic acid 2-(3,5-bis-oxiranyl methyl-2,4,6-trioxo-[1,3,5]triazine-1-yl)ethyl ester. Alternatively, the epoxy compound having the isocyanuric acid ring may be a mixture of: 1,3,5-tris(2,3-epoxypropyl)-1,3,5-triazine-2,4,6 (1H,3H,5H)-trione, and an addition reaction product of 1,3,5-tris(2,3-epoxypropyl)-1,3,5-triazine-2,4,6(1H, 3H, 5H)-trione and propionic acid anhydride.

In the first aspect of the present teaching, the thermosetting resin composition may further contain a thermoplastic resin; and the thermoplastic resin may be polyether ether ketone.

The curing agent may be acid anhydride. Further, the curing agent may be at least one selected from the group consisting of: methyltetrahydrophthalic acid anhydride; tetrapropenylsuccinic anhydride; ester of aliphatic acid dianhydride and polyalkylene glycol; methylbicyclo[2,2,1]heptane-2,3-dicarboxylic anhydride; and 1,2,4-benzene tricarboxylic 1,2-anhydride.

In the first aspect of the present teaching, the thermosetting resin composition may further contain glass fiber.

According to a second aspect related to the present teaching, there is provided a sliding member including:

a sliding surface; and a self-lubricating liner formed on the sliding surface by the thermosetting resin composition of the first aspect.

The sliding member related to the second aspect may be a sliding bearing; and the sliding bearing may be a spherical bearing. Alternatively, the sliding member may include a head portion, a shaft portion, and a thread portion; wherein the self-lubricating liner may be formed on an outer circumferential surface of the shaft portion.

According to a third aspect related to the present teaching, there is provided a method for producing a sliding member, the method including:

applying a thermosetting resin composition on a sliding surface of a body of the sliding member; and
curing the thermosetting resin composition applied on the sliding surface to form a self-lubricating resin layer,
wherein the thermosetting resin composition contains:
an epoxy compound having an isocyanuric acid ring represented by the following formula (1):

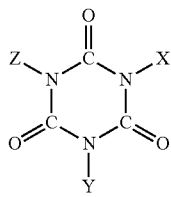

(1)

in the formula (1), at least one of X, Y and Z is a group containing an epoxy ring, and when X, Y or Z contains no epoxy ring, X, Y or Z containing no epoxy ring is an atom of H, a group composed only of C and H, or a group composed only of C, H and O;
and
a solid lubricant.
The resin layer formed in such a manner can function as an excellent self-lubricating liner.
The method for producing the sliding member related to the third aspect may further include cutting or grinding the self-lubricating resin layer so that the self-lubricating resin layer has a desired size.

DESCRIPTION OF THE PREFERRED EMBODIMENTS

In the following, an explanation will be made about a thermosetting resin composition related to the present teaching and a sliding member with a self-lubricating liner made from the thermosetting resin composition.

<Sliding Member>

Figure 1A:
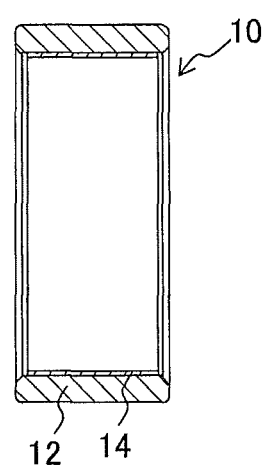
FIG. 1A is a longitudinal sectional view of a sleeve bearing related to the present teaching cut along an axial direction of the sleeve bearing.
Figure 1B:
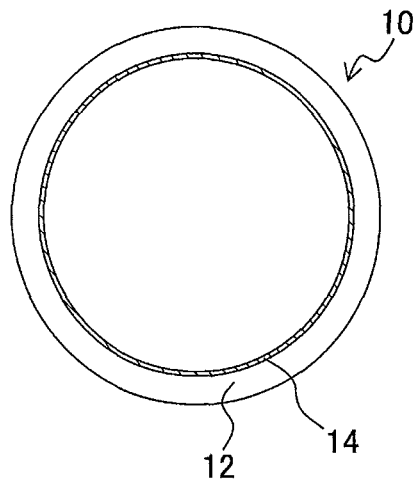
FIG. 1B is a lateral sectional view of the sleeve bearing cut along a direction perpendicular to the axis.

At first, an exemplary sliding member including the self-lubricating liner made from the thermosetting resin composition related to the present teaching will be explained while referring to FIGS. 1A and 1B. A sleeve bearing 10 shown in FIGS. 1A and 1B includes a cylindrical outer race member (body) 12 which is made of metal such as bearing steel, stainless steel, duralumin material, titanium alloy and the like, and a self-lubricating liner layer 14 which is formed on the inner circumferential surface (sliding surface) of the outer race member 12. The self-lubricating liner layer 14 is formed by applying the thermosetting resin composition related to the present teaching, which will be described below, on the inner circumferential surface of the outer race member 12 and then curing the applied thermosetting resin composition. The size adjustment of the self-lubricating liner can be easily performed by grinding and/or cutting. Accordingly, in this sense, the self-lubricating liner is also referred to as a "machinable liner (processable liner)" as appropriate. The sliding member includes not only a sleeve bearing used for rotary motion or translational (linear) motion but also various sliding members such as a spherical bearing and a reamer bolt which will be described later. These sliding members are also included in an object of the present teaching.

<Thermosetting Resin Composition>

The thermosetting resin composition contains, as a component mainly composing the resin, an epoxy compound having an isocyanuric acid ring represented by the following formula (1) (hereinafter referred to simply as an "epoxy compound having the isocyanuric acid ring"):

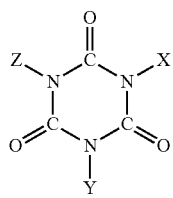

(1)

In the formula (1), at least one of X, Y, Z is a group containing an epoxy ring, and when X, Y or Z contains no epoxy ring, X, Y or Z containing no epoxy ring is an atom of H, a group composed only of C and H, or a group composed only of C, H and O. The epoxy compound having the isocyanuric acid ring represented by the formula (1) is an epoxy compound wherein all of the X, Y, Z in the formula (1) are each the group containing the epoxy ring, an epoxy compound wherein two of the X, Y, Z in the formula (1) are each the group containing the epoxy ring, or an epoxy compound wherein one of the X, Y, Z in the formula (1) is the group containing the epoxy ring.

In the compound wherein all of the X, Y, Z in the formula (1) are each the group containing the epoxy ring, the X, Y and Z are not particularly limited provided that each of the X, Y and Z is the group containing the epoxy ring. However, the X, Y and Z are each preferably a group containing the epoxy ring and composed only of H, C and O. For example, each of the X, Y and Z may be an epoxy group; an alkyl group substituted by the epoxy group, such as a glycidyl group; or an aryl group substituted by the epoxy group. Further, the X, Y, Z may be groups which are same with one another, or mutually different groups. The epoxy compound having the isocyanuric acid ring is preferably a compound applicable to a sliding surface and capable of forming a self-lubricating liner which hardly wears after being cured. From such a viewpoint, the group containing the epoxy ring is preferably the glycidyl group. An epoxy compound in which all the X, Y, Z in the formula (1) are each the glycidyl group is 1,3,5-tris(2,3-epoxypropyl)-1,3,5-triazine-2,4,6 (1H,3H,5H)-trione, represented by the following formula (2) (also known under a different name of: trisepoxy propyl isocyanurate; tris(2,3-epoxypropyl) isocyanurate, hereinafter referred to as "TEPIC" (trademark), as appropriate).

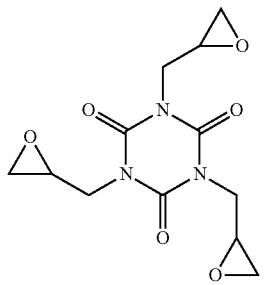

(2)

In the compound wherein two of the X, Y, Z in the formula (1) are each the group containing the epoxy ring, each of the two groups containing the epoxy ring is not particularly limited provided that each of the two groups contains the epoxy ring, in a similar manner as the compound wherein all of the X, Y and Z in the formula (1) are each the group containing the epoxy ring. However, each of the two groups containing the epoxy group is preferably a group containing the epoxy ring and composed only of H, C and O, and particularly preferably a glycidyl group.

In the formula (1), X, Y or Z containing no epoxy ring is an atom of H, a group composed only of C and H, or a group composed only of C, H and O. The group composed only of C and H, and the group composed only of C, H and O can be exemplified by a substituted or unsubstituted alkyl group, a substituted or unsubstituted aryl group, and the like. From the viewpoint of forming the self-lubricating liner, X, Y or Z containing no epoxy ring is preferably a unsubstituted alkyl group, a group composed only of C, H and O having an acrylic acid ester structure, or a group composed only of C, H and O having a methacrylic acid ester structure.

The compound wherein two of the X, Y and Z in the formula (1) are each the group containing the epoxy ring can be exemplified by: 1-methyl-3,5-bis-oxiranyl methyl-[1,3,5]triazine-2,4,6-trione represented by the following formula (3); acrylic acid 2-(3,5-bis-oxiranyl methyl-2,4,6-trioxo-[1,3,5]triazine-1-yl)ethyl ester represented by the following formula (4); and 2-methyl-acrylic acid 2-(3,5-bis-oxiranyl methyl-2,4,6-trioxo-[1,3,5]triazine-1-yl)ethyl ester represented by the following formula (5).

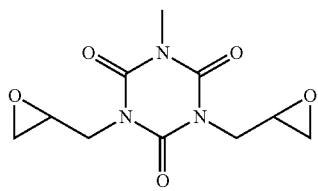

(3)

The compound represented by the formula (3) is an epoxy compound in which two of the X, Y, and Z in the formula (1) are each a glycidyl group, and a remaining one is a methyl group.

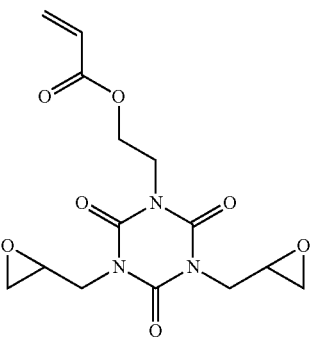

(4)

The compound represented by the formula (4) is an epoxy compound in which two of the X, Y, Z in the formula (1) are each a glycidyl group, and a remaining one has an acrylic acid ester structure.

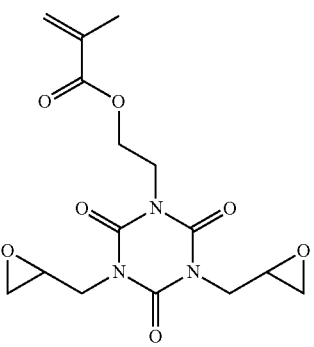

(5)

The compound represented by the formula (5) is an epoxy compound in which two of the X, Y, Z in the formula (1) are each a glycidyl group, and the remaining one has a methacrylic acid ester structure.

In the compound wherein one of the X, Y, Z in the formula (1) is the group containing the epoxy ring, the group containing the epoxy ring is not particularly limited provided that the group contains the epoxy ring, in a similar manner as the compound described above wherein all of the X, Y and Z in the formula (1) are each the group containing the epoxy ring. However, the group containing the epoxy group is preferably a group containing the epoxy ring and composed only of H, C and O, and particularly a glycidyl group.

In the compound wherein only one of the X, Y and Z in the formula (1) is the group containing the epoxy ring, each of the remaining two of the X, Y, Z not containing the epoxy ring is a group composed only of C and H, a group composed only of C, H and O, or an atom of H, in a similar manner as the compound wherein two of the X, Y and Z in the formula (1) are each the group containing the epoxy group.

In the epoxy compound having the isocyanuric acid ring related to the present teaching may use the three kinds of compounds, namely, the compound wherein all of the X, Y, Z in the formula (1) are each the group containing the epoxy ring, the compound wherein two of the X, Y, Z in the formula (1) are each the group containing the epoxy ring, and the compound wherein one of the X, Y, Z in the formula (1) is the group containing the epoxy ring, either singly or as a mixture of two kinds of or three kinds (all) of these three compounds by mixing the compounds at any mixing ratio. For example, as the epoxy compound having the isocyanuric acid ring, it is allowable to use an addition reaction product of the compound wherein all of the X, Y, Z in the formula (1) are each the group containing the epoxy ring, and acid anhydride. By subjecting the epoxy ring and the acid anhydride to addition reaction, the epoxy ring is opened, thereby making it possible to eliminate the epoxy ring from one group of, or two group of the X, Y and Z. Therefore, the addition reaction product of the compound wherein all of the X, Y, Z in the formula (1) are each the group containing the epoxy ring and the acid anhydride is a mixture of the compound wherein two of the X, Y, Z in the formula (1) are each the group containing the epoxy ring and the compound wherein one of the X, Y, Z in the formula (1) is the group containing the epoxy ring. For example, the mixture can be exemplified by an addition reaction product of TEPIC (trademark) represented by the formula (2) as described above and the propionic acid anhydride. Further, as the epoxy compound having the isocyanuric acid ring related to the present teaching, it is possible to use a mixture of TEPIC (trademark) and the addition reaction product of TEPIC (trademark) and the propionic acid anhydride. The mixture of TEPIC (trademark) and the addition reaction product of TEPIC (trademark) and the propionic acid anhydride is a mixture of the epoxy compound wherein all of the X, Y, Z in the formula (1) are each the group containing the epoxy ring, the epoxy compound wherein two of the X, Y, Z in the formula (1) are each the group containing the epoxy ring, and the epoxy compound wherein one of the X, Y, Z in the formula (1) is the group containing the epoxy ring.

The epoxy compound having the isocyanuric acid ring represented by the formula (1) has quite excellent heat resistance in addition to having the thermosetting (thermo-curable) property, and thus is suitable for a self-lubricating liner of a sliding member, and the like. In particular, for a compound to be used as the sliding member incorporated in an aircraft, the compound is required to have a heat resistance of 163 degrees Celsius or more. In this regard, the epoxy compound having the isocyanuric acid ring is also suitable for such an application. Further, since the epoxy compound having the isocyanuric acid ring has a small thermal compression during the thermo-curing, any film separation and/or any cracking can be suppressed during the thermal curing, which in turn makes it possible to obtain a cured product with a great thickness. Since the cured product with a large thickness can be obtained, in a case of performing the size adjustment of a machinable liner through cutting and/or grinding, it is possible to set a wide range for the size adjustment.

The epoxy compound having the isocyanuric acid ring may be contained preferably in an amount of 5% by weight to 50% by weight with respect to the entire amount of the thermosetting resin composition related to the present teaching. In a case that the content amount of the epoxy compound having the isocyanuric acid ring with respect to the entire amount of the thermosetting resin composition is less than 5% by weight, the fluidity of the resin may become insufficient and the application of the epoxy compound may become difficult. Also, the strength of the liner may become insufficient. On the other hand, in a case that the content amount of the epoxy compound having the isocyanuric acid ring with respect to the entire amount of the thermosetting resin composition exceeds 50% by weight, the content amount of a solid lubricant (as will be described later on) becomes small, and the lubricating property is lowered.

The thermosetting resin composition related to the present teaching preferably contains a curing agent which reacts with the epoxy compound having the isocyanuric acid ring and which promotes the thermal curing. As the curing agent, although it is possible to use polyamine, acid anhydride, phenol and the like, the acid anhydride is preferred since the curing speed can be easily controlled. Among the acid anhydride, it is particularly preferred to use: methyltetrahydrophthalic acid anhydride (hereinafter referred to as "Me-THPA" as appropriate), tetrapropenylsuccinic anhydride, ester of aliphatic acid dianhydride and polyalkylene glycol; acid anhydride such as methylbicyclo[2,2,1]heptane-2,3-dicarboxylic anhydride, 1,2,4-benzene tricarboxylic 1,2-anhydride, and the like; or any mixture of the above-described substances. In particular, in a case that methylbicyclo[2,2,1]heptane-2,3-dicarboxylic anhydride, 1,2,4-benzene tricarboxylic 1,2-anhydride, or any mixture of these substances is used as the curing agent, it is possible to obtain a cured product with high heat-resistant property of which heat-resistant temperature is 200 degrees Celsius or more, which is preferred.

The curing agent may be contained preferably in an amount of 10% by weight to 48% by weight with respect to the entire amount of the resin composition related to the present teaching.

A weight ratio (M:N) of a weight (M) of the curing agent to a weight (N) of the epoxy compound having the isocyanuric acid ring is in a range of (M:N)=65:100 to 165:100. Namely, the weight ratio (M/N) of the weight (M) of the curing agent to the weight (N) of the epoxy compound having the isocyanuric acid ring is in a range of (M/N)=0.65 to 1.65. In a case that the weight ratio of the curing agent to the epoxy compound having the isocyanuric acid ring is less than 0.65, the wear resistance of the cured product of the resin composition may be lowered; in a case that the weight ratio of the curing agent to the epoxy compound having the isocyanuric acid ring exceeds 1.65, the mechanical strength of the cured product may be lowered and the load capacity may be affected.

The thermosetting resin composition related to the present teaching may contain a cure accelerator such as an imidazole-based curing agent that is 2-undecyl imidazole, 2-ethyl-4-methyl imidazole, or a mixture of 2-undecyl imidazole and 2-ethyl-4-methyl imidazole, so as to increase the curing speed without reducing the strength and heat resistance of the cured product to thereby improve the productivity. Further, in the thermosetting resin composition, the cure accelerator may be contained in an amount of 15 parts by weight or less with respect to 100 parts by weight of the epoxy resin (the epoxy compound) having the isocyanuric acid ring.

The thermosetting resin composition related to the present teaching may further contain a diluent so as to reduce the viscosity of the resin composition so that the resin composition can be easily applied on the sliding surface. The diluent is preferably a reactive diluent such as: 1,2-epoxy-3-(trioxy)propane, alkyl glycidyl ether, phenyl glycidyl ether, cresyl glycidyl ether, n-butyl glycidyl ether, versatic acid glycidyl ether, styrene oxide, ethylhexyl glycidyl ether, butyl phenyl glycidyl ether, 1,6-hexanediol diglycidyl ether, neopentyl glycol diglycidyl ether, diethylene glycol diglycidyl ether, trimethylolpropane triglycidyl ether. Since the diluent does not adversely affect the properties of the thermosetting resin composition related to the present teaching (such as the sliding performance, heat-resistance, processability, and the like), the diluent is preferably contained in an amount of 65% by weight or less with respect to the blending amount of the epoxy compound.

The resin composition related to the present teaching contains a solid lubricant. The solid lubricant may be contained in an amount of 10% by weight to 70% by weight with respect to the entire amount of the resin composition related to the present teaching. Further, the resin composition related to the present teaching may contain polytetrafluoroethylene resin (hereinafter abbreviated as "PTFE" as appropriate), as the solid lubricant; PTFE may be contained in an amount of 10% by weight to 70% by weight with respect to the entire amount of the resin composition related to the present teaching. More preferably, PTFE can be contained in an amount of 30% by weight to 60% by weight with respect to the entire amount of the resin composition related to the present teaching. It is allowable to use any form of PTFE, such as powdery PTFE, fibrous PTFE, and the like, either singly or in combination thereof. It is allowable to perform a surface treatment for the particles or fibers of the powdery PTFE or fibrous PTFE wherein the surface of the particles or fibers is etched by sodium-naphthalene and then covered by an epoxy-modified acrylate. By performing such a surface treatment, the affinity of PTFE with the epoxy resin made from the epoxy compound having the isocyanuric acid ring is enhanced, thereby realizing more firm bonding of PTFE with the epoxy resin. Therefore, when using the resin composition related to the present teaching as a self-lubricating liner, it is possible to suppress any separation or detaching of the particles and fibers of PTFE from the self-lubricating liner during the sliding movement, thereby making it possible to reduce a wear amount (abrasion loss) of the self-lubricating liner.

The average particle diameter or fiber length of PTFE is preferably within a range of 75 μm to 180 μm. By doing so, even when the blending amount of PTFE is increased, PTFE hardly aggregates, which in turn increase the area ratio of PTFE present in the surface after the curing and allows PTFE to be distributed uniformly. In a case that the average particle diameter or fiber length of PTFE is less than 75 PTFE easily aggregates when the resin having viscosity is being kneaded, which in turn hinders any uniform distribution of PTFE on the surface of the resin after the curing. Further, in a case that the average particle diameter or fiber length of PTFE is outside the range of 75 μm to 180 μm, the wear amount of the self-lubricating liner becomes relatively large.

In the present teaching, a solid lubricant other than PTFE can be used. For example, the resin composition related to the present teaching may contain graphite, melamine cyanurate, or the like. By using melamine cyanurate together with PTFE, the friction coefficient of the resin composition after being cured can be lowered further than in a case of using PTFE singly. In such a case, melamine cyanurate is preferably contained in an amount of 30% by weight or less with respect to the entire amount of the resin composition. In a case that the content amount of melamine cyanurate exceeds 30% by weight, although the friction coefficient of the self-lubricating liner is lowered, the wear amount tends to be increased. Melamine cyanurate has a structure in which melamine molecules and cyanuric acid molecules each having a six-membered ring structure are bonded by the hydrogen bond, and are arranged in a planar form. The planes of the bonded melamine molecules and cyanuric acid molecules are overlapped with each other in a layered (laminated) form by a weak bonding, thereby forming a cleavage slip structure such as that of molybdenum disulfide ($MoS_2$), graphite or the like. Such a structure is considered as contributing to the solid lubricating property.

By using melamine cyanurate together with PTFE, it is possible to lower the friction coefficient of the obtained self-lubricating liner further than in a case of using PTFE singly as the solid lubricant. In particular, it has been found out that, by making the total of the content amount of PTFE and the content amount of melamine cyanurate within a range of 30% by weight to 40% by weight, the friction coefficient of the self-lubricating liner could be lowered approximately by 10% as compared with the case of using PTFE singly.

Further, the thermosetting resin composition related to the present teaching may contain a thermoplastic resin, in addition to the solid lubricant, in order to obtain satisfactory sliding property and toughness. In particular, a particulate thermo-plastic resin has effects of imparting the sliding property to a cured product of the thermosetting resin composition and thereby lowering the friction coefficient thereof. Furthermore, the particulate thermoplastic resin has the wear resistance as well. Accordingly, in a case that the blending amount of the solid lubricant is great, the solid lubricant and the particulate thermoplastic resin can be used together to thereby improve the sliding property while suppressing any lowering in the mechanical strength of the cured product. As the particulate thermoplastic resin, it is possible to use a crystalline resin such as polyether ether ketone (hereinafter referred to as "PEEK" as appropriate) of which average particle diameter (D50) is in a range of 20 μm to 50 μm, nylon 6 (PA6) of which average particle diameter (D50) is in a range of 5 μm to 10 μm, nylon 12 (PA12) of which average particle diameter (D50) is in a range of 13 μm to 20 μm, and the like. In particular, a cured product obtained from a thermosetting resin composition using PTFE and PEEK in combination has a coefficient of linear expansion smaller than in a cured product obtained from a thermosetting resin composition containing only PTFE. Accordingly, in a case of forming, from the thermosetting resin composition using PTFE and PEEK in combination, the self-lubricating liner layer 14 on the inner circumferential surface of the outer race member 12 as shown in FIGS. 1A and 1B described above, the internal stress in the self-lubricating liner layer 14 accompanying with the thermal expansion or thermal compression of the metallic outer race 12 is lowered, and thus the size change amount of the self-lubricating liner layer 14 can be suppressed.

From the viewpoint of improving the sliding property and toughness of the cured product of the thermosetting resin composition, the particulate thermoplastic resin is preferably contained in an amount of 30% by weight or less with respect to the entire amount of the thermosetting resin composition. Further, PEEK has effects of raising the glass transition point of the cured product of the resin composition and to improve the heat resistance of the cured product. From the viewpoint of improving the heat resistance of the cured product of the resin composition, PEEK is preferably contained in an amount of 10% by weight to 30% by weight with respect to the entire amount of the thermosetting resin composition.

The resin composition related to the present teaching may be added with glass fiber, for the purpose of improving the strength of the self-lubricating liner. As the glass fiber, it is possible to use a circular cross-sectional glass fiber having a circular cross section, or irregular shape (non-circular) cross-sectional glass fiber having a non-circular cross section.

The resin composition related to the present teaching may further contain phosphate. The phosphate is capable of improving the initial conformability when using the resin composition as the self-lubricating liner, and of stabilizing the friction coefficient quicker than in a case that the phosphate is not blended in the resin composition. The phosphate is preferably contained in an amount of 5% by weight or less in the resin composition. The phosphate can be phosphate of alkali metal or alkali earth metal exemplified by: tertiary phosphate, secondary phosphate, pyrophosphate, phosphite, or metaphosphate. Specifically, the phosphate can be exemplified by: trilithium phosphate, lithium dihydrogen phosphate, dibasic sodium phosphate, lithium pyrophosphate, tricalcium phosphate, calcium monohydrogen phosphate, calcium pyrophosphate, lithium metaphosphate, magnesium metaphosphate, calcium metaphosphate, and the like.

The resin composition related to the present teaching may contain fumed silica. The fumed silica is used to impart the thixotropy to the resin composition. In a case that a resin composition with any insufficient thixotropy is applied on the sliding surface, such a resin composition drops off from the sliding surface as drips, which in turn makes the formation of the liner be difficult. Accordingly, the fumed silica can be added to thereby adjust the thixotropy. The fumed silica is preferably added in an amount of 5% by weight or less with respect to the entire amount of the resin composition. In a case that the blending amount of the fumed silica exceeds 5% by weight, the wear amount of the liner is increased, which is not desired.

The resin composition related to the present teaching is preferably in a liquid form at room temperature. With this, the resin composition can be easily applied on the sliding surface of the sliding member, and can be cured by being heated after the application. In a case that the resin composition is used for the aircraft application, the glass transition point Tg of the resin composition related to the present teaching is preferably 150 degrees Celsius or more, due to the following two reasons, namely: the heat resistance required by AS81934 standard (to be descried later on) needs to be satisfied; and the heat resistance same as or greater than that of the resin liner based on polyether ketone disclosed in Patent Literature 3 (Japanese Patent Application Laid-open No. 2011-247408) is desired to be secured.

Since the resin composition related to the present teaching uses a liquid thermosetting resin as the base for the resin, the solid lubricant containing PTFE can be easily mixed, and PTFE, or PTFE together with particulate thermoplastic resin, can be added in a high blending amount in the range of 10% by weight to 70% by weight that could not been added in the case of using the thermoplastic resin as the base resin. Accordingly, it is possible to produce a self-lubricating liner with a lower friction coefficient and with less wear.

The present teaching also provides a manufacturing method for producing a sliding member formed with a self-lubricating liner by: applying, on a sliding surface of a body of the sliding member, a thermosetting resin composition containing an epoxy compound having the isocyanuric acid ring represented by the above-described formula (1), a curing agent, and PTFE as a solid lubricant; and curing the applied thermosetting resin composition by heating the applied thermosetting resin composition so as to form a self-lubricating liner. The self-lubricating liner becomes a machinable liner which can be subjected to an after-processing through cutting and/or grinding so that the self-lubricating liner can have a desired size.

The sliding member related to the present teaching may be a spherical bearing provided with an outer race member having a concave first bearing surface and an inner race member having a convex second bearing surface slidably movable on the first bearing surface. In a case of manufacturing such a spherical bearing, at first, the thermosetting resin composition according to the present teaching is applied on the first bearing surface or the second bearing surface as the sliding surface. Subsequently, the thermosetting resin composition applied on the first or second bearing surface is heated to be primarily cured. Afterwards, the inner race member is inserted in the outer race member and the outer race member is pressed to be plastically deformed so as to follow the convex surface of the inner race member. Then, the thermosetting resin composition is heated to be secondarily cured. Accordingly, the self-lubricating liner can be formed.

As described above, the thermosetting resin composition related to the present teaching can be applied on the sliding surface and then cured by heating. At this time, any high temperature and high pressure conditions are not required, unlike in a case of using a thermoplastic resin. Accordingly, polytetrafluoroethylene resin does not generate any decomposition gas because polytetrafluoroethylene resin is not heated above its melting point, and thus a relatively large amount of polytetrafluoroethylene resin can be blended safely to the thermosetting resin composition. Further, since the cured resin composition adheres quite firmly to the surface (base surface) to which is applied, it is also possible to eliminate the process for previously roughening the base surface. Due to the above advantages, the safety of operation and the power saving performance can be improved, and the equipment cost also can be reduced. Furthermore, since the cured resin composition can be easily cut or ground, it is possible to provide a machinable liner for which an after-processing such as size adjustment can be performed. According to the method for producing the sliding member related to the present teaching, it is possible to produce bearings such as a reamer bolt, a spherical bearing including a self-lubricating liner provided on a sliding surface between outer and inner race members, and the like, easily and with low cost and high precision.

EXAMPLES

A resin composition related to the present teaching and a sliding member provided with a self-lubricating liner composed of the resin composition related to the present teaching will be explained based on the following examples. However, the present teaching is not limited to the following examples.

<Manufacture of Thermosetting Resin Compositions 1 to 32>

[Resin Compositions 1 to 29]

There were prepared resin compositions 1 to 29 in a liquid form so that each of the liquid resin compositions 1 to 29 had the composition of resin composition as shown in TABLE 1 and TABLE 2 as follows by uniformly mixing: an epoxy resin compound having the isocyanuric acid ring represented by the above-described formula (1), a curing agent, a cure accelerator and a solid lubricant, and further, as necessary, a diluent, a thermoplastic resin, glass fiber, dibasic sodium phosphate and fumed silica. Note that in TABLE 1 and TABLE 2, an epoxy compound "A" is a mixture of the compound represented by the formula (2) as described above (TEPIC (trademark)) and the addition reaction product of TEPIC (trademark) and the propionic acid anhydride. Further, an epoxy compound "B" is a compound represented by the above-described formula (3), an epoxy compound "C" is a compound represented by the above-described formula (4), and an epoxy compound "D" is a compound represented by the above-described formula (5).

[Resin Composition 30]

Resin composition 30 is a resin composition using a bisphenol A type epoxy compound, rather than using the epoxy resin compound having the isocyanuric acid ring represented by the formula (1) and used in the resin compositions 1 to 29. A resin composition 30 in a liquid state was prepared by uniformly mixing: bisphenol A diglyceride ether (DGEBA) as the bisphenol A type epoxy compound; methyltetrahydrophthalic acid anhydride (Me-THPA) as the curing agent; tetraphenyl phosphonium bromide (TPP-PB) as the cure accelerator; glass fiber (manufactured by NITTO BOSEKI CO., LTD., product name: PF80E-401, average fiber length: 80 μm×average diameter ϕ: 11 μm); polytetrafluoroethylene (PTFE) (manufactured by KITAMURA LIMITED, product name: KT-60); and fumed silica (manufactured by NIPPON AEROSIL CO., LTD., product name: AEROSIL (trademark) R805), so that the resin composition 30 had the composition of resin composition indicated in TABLE 3 as follows.

[Resin Composition 31]

Resin composition 31 is a urethane resin composition using a urethane methacrylate, rather than using the epoxy resin compound having the isocyanuric acid ring represented by the formula (1) and used in the resin compositions 1 to 29. A resin composition 31 in a liquid state was prepared by uniformly mixing: urethane methacrylate (manufactured by HENKEL JAPAN LTD., product name: LOCTITE (trademark) 648); polytetrafluoroethylene (PTFE) (manufactured by DU PONT KABUSHIKI KAISHA, product name: MP-1300-J); molybdenum disulfide ($MoS_2$)(manufactured by DAITOU CO. LTD., product name: LM-11 Z Powder); glass fiber (manufactured by FIBERTEC, INC., product name: Microglass (trademark) 9110, average fiber length: 150 μm×average diameter ϕ: 16 μm); curing agent (manufactured by SIGMA-ALDRICH CO. LLC., benzoyl peroxide); cure accelerator (manufactured by SIGMA-ALDRICH CO. LLC., N,N-dimethylaniline); and fumed silica (manufactured by NIPPON AEROSIL CO., LTD., product name: AEROSIL (trademark) R805), so that the resin composition 31 had the composition of resin composition indicated in TABLE 4 as follows.

[Resin Composition 32]

Resin composition 32 is an acrylic resin composition using acrylate, rather than using the epoxy resin compound having the isocyanuric acid ring represented by the formula (1) and used in the resin compositions 1 to 29. A resin composition 32 in a liquid state was prepared by uniformly mixing: dipentaerythritol pentaacrylate (manufactured by SARTOMER JAPAN KABUSHIKI KAISHA, product name: SR399); triethylene glycol dimethacrylate (manufactured by SARTOMER JAPAN KABUSHIKI KAISHA, product name: SR205); aramid fiber (manufactured by DU PONT KABUSHIKI KAISHA, product name: Kevlar (trademark) Pulp DRY, 0.8 mm); curing agent (manufactured by NORAC, INC., product name: BENOX (trademark) L-40LV); cure accelerator (manufactured by SIGMA-ALDRICH CO. LLC., 4,N,N-trimethylaniline); and fumed silica (manufactured by NIPPON AEROSIL CO., LTD., product name: AEROSIL (trademark) R805), so that the resin composition 32 had the composition of resin composition indicated in TABLE 5 as follows.

TABLE 1

COMPOSITION OF RESIN COMPOSITIONS (% by weight)

| Resin Composition | Epoxy Compound [1] | | | | Curing Agent [2] | | | | | Cure Accelerator [3] | | Diluent [4] | Solid Lubricant [5] | | Thermoplastic resin [6] | | Glass Fiber [7] | | | Dibasic sodium phosphate | Fumed Silica [8] |
|---|---|---|---|---|---|---|---|---|---|---|---|---|---|---|---|---|---|---|---|---|---|
| | A | B | C | D | a | b | c | d | e | EMI | UI | | PTFE | MC | PEEK (1) | PEEK (2) | GF (1) | GF (2) | GF (3) | | |
| 1 | 22.6 | – | – | – | 26.6 | – | – | – | – | 0.8 | – | – | 30 | – | 10 | – | 10 | – | – | – | – |
| 2 | 22.6 | – | – | – | 26.6 | – | – | – | – | 0.8 | – | – | 30 | – | – | 10 | 10 | – | – | – | – |
| 3 | 26.6 | – | – | – | 31.4 | – | – | – | – | 1 | – | – | 30 | – | – | – | 10 | – | – | – | 1 |
| 4 | 22.6 | – | – | – | 26.6 | – | – | – | – | 0.8 | – | – | 40 | – | – | – | 10 | – | – | – | – |
| 5 | 24.2 | – | – | – | 24.3 | – | – | – | – | 0.5 | – | – | 10 | 30 | – | – | 10 | – | – | – | 1 |
| 6 | 24.3 | – | – | – | 28.8 | – | – | – | – | 0.9 | – | – | 10 | – | – | 30 | 5 | – | – | – | 1 |
| 7 | 8.6 | – | – | – | 10.1 | – | – | – | – | 0.3 | – | – | 70 | – | – | – | 10 | – | – | – | 1 |
| 8 | 40.6 | – | – | – | 48 | – | – | – | – | 1.4 | – | – | 10 | – | – | – | – | – | – | – | – |
| 9 | 18 | – | – | – | – | 7 | 14 | – | – | – | 1 | – | 35 | – | 15 | – | 10 | – | – | – | – |
| 10 | 32 | – | – | – | – | 11 | 22 | – | – | 1 | – | – | 30 | – | – | – | 3 | – | – | – | 1 |
| 11 | 29.2 | – | – | – | – | 8 | 16.3 | – | – | 0.5 | – | – | 30 | – | – | – | 15 | – | – | – | 1 |
| 12 | 17 | – | – | – | – | – | 17 | – | – | – | 1 | – | 30 | – | 25 | – | 10 | – | – | – | – |
| 13 | 17 | – | – | – | – | – | 17 | – | – | – | 1 | – | 30 | – | 25 | – | – | 10 | – | – | – |
| 14 | 17 | – | – | – | – | – | 17 | – | – | – | 1 | – | 30 | – | 25 | – | – | – | 10 | – | – |

TABLE 2

| Resin Composition | Epoxy Compound [1] | | | | Curing Agent [2] | | | | | Cure Accelerator [3] | |
|---|---|---|---|---|---|---|---|---|---|---|---|
| | A | B | C | D | a | b | c | d | e | EMI | UI |
| 15 | 13 | – | – | – | – | – | 21 | – | – | 1 | – |
| 16 | 30.2 | – | – | – | – | – | 30.1 | – | – | 0.7 | – |
| 17 | 26.7 | – | – | – | – | – | 26.7 | – | – | 0.6 | – |
| 18 | 19 | – | – | – | – | – | 19 | – | – | 1 | – |
| 19 | 36.6 | – | – | – | – | – | 24.4 | – | – | 1 | – |
| 20 | 14.4 | – | – | – | – | – | 10.8 | – | 10.8 | 1 | – |
| 21 | 23.6 | – | – | – | – | – | – | 35.4 | – | 3 | – |
| 22 | 9.5 | – | – | – | – | – | – | 14.3 | – | 1.2 | – |
| 23 | – | 21.1 | – | – | 27.2 | – | – | – | – | 0.7 | – |
| 24 | – | – | 24.7 | – | 23.4 | – | – | – | – | 0.9 | – |
| 25 | – | – | – | 25.2 | 22.9 | – | – | – | – | 0.9 | – |
| 26 | 10.9 | 10.9 | – | – | 26.5 | – | – | – | – | 0.7 | – |
| 27 | 12 | – | 12 | – | 24.1 | – | – | – | – | 0.9 | – |
| 28 | 12 | – | – | 12 | 24.1 | – | – | – | – | 0.9 | – |
| 29 | 95 | – | – | – | – | – | – | – | – | 5 | – |

| Resin Composition | Diluent [4] | Solid Lubricant [5] | | Thermoplastic resin [6] | | Glass Fiber [7] | | | Dibasic sodium phosphate | Fumed Silica [8] |
|---|---|---|---|---|---|---|---|---|---|---|
| | | PTFE | MC | PEEK (1) | PEEK (2) | GF (1) | GF (2) | GF (3) | | |
| 15 | 8 | 40 | – | 10 | – | 5 | – | – | – | 2 |
| 16 | – | 30 | – | – | – | 7 | – | – | 1 | 1 |
| 17 | – | 30 | – | 10 | – | – | – | – | 5 | 1 |
| 18 | – | 40 | – | – | 20 | – | – | – | – | 1 |
| 19 | – | 30 | – | – | – | 7 | – | – | – | 1 |
| 20 | – | 55 | – | – | – | 7 | – | – | – | 1 |
| 21 | – | 30 | – | – | – | 7 | – | – | – | 1 |
| 22 | – | 60 | – | 10 | – | 5 | – | – | – | – |
| 23 | – | 30 | – | 10 | – | 10 | – | – | – | 1 |
| 24 | – | 30 | – | 10 | – | 10 | – | – | – | 1 |
| 25 | – | 30 | – | 10 | – | 10 | – | – | – | 1 |
| 26 | – | 30 | – | 10 | – | 10 | – | – | – | 1 |
| 27 | – | 30 | – | 10 | – | 10 | – | – | – | 1 |
| 28 | – | 30 | – | 10 | – | 10 | – | – | – | 1 |
| 29 | – | – | – | – | – | – | – | – | – | – |

In TABLE 1 and TABLE 2 as above, the abbreviation and the like of components in the resin compositions indicate the following substances:

1) Epoxy compound "A": 1,3,5-tris(2,3-epoxypropyl)-1,3,5-triazine-2,4,6(1H, 3H, 5H)-trione (TEPIC (trademark)), 43% by weight to 63% by weight; and an addition reaction product of TEPIC (trademark) and propionic acid anhydride (manufactured by NISSAN CHEMICAL INDUSTRIES, LTD., product name: TEPIC-PAS B26 (trademark)), 37% by weight to 57% by weight Epoxy Compound "B": 1-methyl-3,5-bis-oxiranyl methyl-[1,3,5]triazine-2,4,6-trione (manufactured by SHIKOKU CHEMICALS CORPORATION, product name: MeDGIC (trademark), Cas No. 69804-58-6)

Epoxy Compound "C": acrylic acid 2-(3,5-bis-oxiranyl methyl-2,4,6-trioxo-[1,3,5]triazine-1-yl)ethyl ester (manufactured by SHIKOKU CHEMICALS CORPORATION, product name: AcDGIC (trademark), Cas No. 1392417-38-7)

Epoxy Compound "D": 2-methyl-acrylic acid 2-(3,5-bis-oxiranyl methyl-2,4,6-trioxo-[1,3,5]triazine-1-yl)ethyl ester (manufactured by SHIKOKU CHEMICALS CORPORATION, product name: McDGIC (trademark), Cas No. 1392417-40-1)

2) Curing Agent "a": methylbicyclo[2,2,1]heptane-2,3-dicarboxylic anhydride

Curing Agent "b": 1,2,4-benzene tricarboxylic 1,2-anhydride.

Curing Agent "c": methyltetrahydrophthalic acid anhydride (Me-THPA)

Curing Agent "d": tetrapropenylsuccinic anhydride (flexibility)

Curing Agent "e": ester of aliphatic acid dianhydride and polyalkylene glycol (flexibility)

3) Cure Accelerator EMI: 2-ethyl-4-methyl imidazole

Cure Accelerator UI: 2-undecyl imidazole

4) Diluent: 1,2-epoxy-3-(trioxy)propane

5) Solid Lubricant PTFE: polytetrafluoroethylene resin (manufactured by KITAMURA LIMITED, product name: KT-60)

Solid Lubricant MC: melamine cyanurate resin (manufactured by BASF, product name: MELAPUR (trademark) MC25)

6) Thermoplastic resin PEEK (1): polyether ether ketone (manufactured by VICTREX PLC., product name: PEEK 150XF, average particle diameter: 23 μm)

Thermoplastic resin PEEK (2): polyether ether ketone (manufactured by VICTREX PLC., product name: PEEK 150PF, average particle diameter: 50 μm)

7) Glass Fiber (GF) (1): circular cross-sectional glass fiber having a circular cross section (manufactured by NITTO BOSEKI CO., LTD., product name: PF80E-401, average fiber length: 80 μm×average diameter: ϕ11 μm)

Glass Fiber (GF) (2): circular cross-sectional glass fiber having a circular cross section (manufactured by NITTO BOSEKI CO., LTD., product name: SS05DE-413, average fiber length: 80 μm×average diameter ϕ6.5 μm)

Glass Fiber (GF) (3): irregular shape (oblong) cross-sectional glass fiber having a non-circular (oblong) cross section (manufactured by NITTO BOSEKI CO., LTD., product name: SSF 05C-404, cross sectional shape: 7 μm×28 average fiber length: 100 μm)

8) Fumed Silica (manufactured by NIPPON AEROSIL CO., LTD., product name: AEROSIL (trademark) R805)

bearing. Next, the self-lubricating resin layers formed by using the resin compositions 1 to 30, respectively, were subjected to cutting and grinding so as to have a liner thickness of 0.25 mm; and the self-lubricating resin layers formed by using the resin compositions 31 and 32, respectively, were subjected to cutting and grinding so as to have a liner thickness of 0.38 mm, thereby completing the formation of machinable liners 1 to 32.

The machinable liners 1 to 32 were subjected to performance evaluation by Evaluations 1 to 5 as explained below. TABLE 7 and TABLE 8 indicate the results of Evaluations 1 to 5. Note that, together with these evaluations, TABLE 7 and TABLE 8 also indicate the weight ratio of the curing agent to the epoxy compound having the isocyanuric acid ring, namely "(curing agent)/(epoxy compound having isocyanuric ring)" in each of the epoxy compositions 1 to 29.

TABLE 3

| | Composition of Bisphenol A type epoxy resin composition | | | | | |
|---|---|---|---|---|---|---|
| | Bisphenol A diglyceride ether (DGEBA) (wt %) | Methyltetra-hydrophthalic acid anhydride (Me-THPA) (wt %) | Tetraphenyl phosphonium bromide (TPP-PB) (wt %) | Glass fiber (GF) (wt %) | Polytetra fluoro ethylene (PTFE) (wt %) | Fumed silica (wt %) |
| Resin Composition 30 | 31.2 | 30.3 | 0.47 | 7.0 | 30 | 1.0 |

TABLE 4

| | Composition of Urethane methacrylate resin composition | | | | | | |
|---|---|---|---|---|---|---|---|
| | Urethane metha-crylate (wt %) | Polytetra fluoro ethylene (PTFE) (wt %) | Molybde-num disulfide (MoS₂) (wt %) | Glass fiber (GF) (wt %) | Thermo-curing agent (wt %) | Cure accele-rator (wt %) | Fumed silica (wt %) |
| Resin Composition 31 | 54.6 | 30 | 5 | 10 | 0.1 | 0.1 | 0.2 |

TABLE 5

| | Composition of Acrylic resin composition | | | | | | |
|---|---|---|---|---|---|---|---|
| | Dipenta-erythritol penta acrylate (wt %) | Triethyl-ene glycol dimethac-rylate (wt %) | Polytetra fluoro ethylene (PTFE) (wt %) | Aramid fiber (wt %) | Thermo-curing agent (wt %) | Cure accele-rator (wt %) | Fumed silica (wt %) |
| Resin Composition 32 | 34.6 | 33.9 | 30 | 1 | 0.2 | 0.1 | 0.2 |

<Manufacture of Self-Lubricating Liners 1 to 32>

Self-lubricating liners (machinable liners) 1 to 32 were produced by using the resin compositions 1 to 32 with the method explained below. At first, a cylindrical sleeve bearing (width (length in the axial direction): 12.7 mm, outer diameter: 30.2 mm, inner diameter: 24.9 mm) as shown in FIGS. 1A and 1B was manufactured by using a material obtained by subjecting SUS630 stainless steel to heat treatment under H1150 condition. Each of the resin compositions 1 to 32 was uniformly applied on the inner circumferential surface of this sleeve bearing by using a dispenser. Subsequently, the applied resin composition was heated to cure the resin composition, and thus a self-lubricating resin layer was formed in the inner circumferential surface of the sleeve <Performance Evaluation of Machinable Liners 1 to 32>

1. Radial Static Limit Load (Static Load Test) (Evaluation 1)

TABLE 6 below shows AS81934 standard requirements in this test. As indicated in the left column of TABLE 6, in AS81934 standard, the radial static limit load is defined based on the material (aluminum alloy and stainless steel) and the inner diameter size of the sleeve bearing. According to the material and the size of the sleeve bearing used in the machinable liners 1 to 32, the sleeve bearing corresponds to part number M81934/1-16C016 described in TABLE 6, and thus the maximum test load was determined to be 140 kN (31,400 lb).

TABLE 6

| Part No. | Radial static limit load (lb) | Oscillation load (lb) |
|---|---|---|
| M81934/1-08A012 | 6,900 | 6,300 |
| M81934/1-08C012 | 10,800 | 6,300 |
| M81934/1-16A016 | 20,000 | 16,500 |
| M81934/1-16C016 | 31,400 | 16,500 |
| M81934/1-24A016 | 30,000 | 22,500 |
| M81934/1-24C016 | 47,100 | 22,500 |

Figure 2:
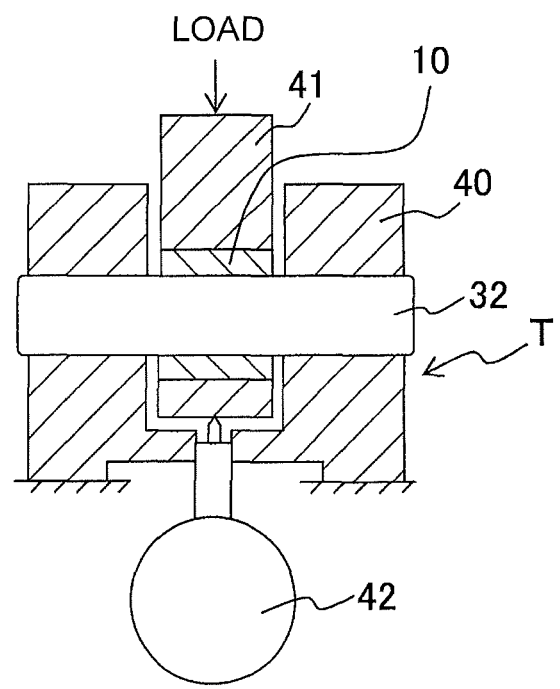
FIG. 2 shows a cross-sectional structure of a test jig in which a sleeve bearing manufactured in Examples is set.

As shown in FIG. 2, the sleeve bearing 10 is set on a test jig T first. The test jig T includes a base portion 40 which has a H-shaped cross section and which supports a shaft member 32, a weight 41 which applies the load in the radial direction of the sleeve bearing 10 into which the shaft member 32 is inserted, and a dial gauge 42 which is provided below the base portion 40. The shaft member 32 made of carbon steel is fitted to the inner circumferential surface of the sleeve bearing 10 to apply a load in the radial direction. The load is gradually increased up to a radial static limit load value 140 kN (31,400 lb). After reaching the radial static limit load value, the load is gradually removed. The displacement is measured by the dial gauge 42 during the test, and the permanent deformation amount when the load is returned to zero is read from the load-displacement curve. According to AS81934 standard requirement, this permanent deformation amount (maximum permissible permanent deformation amount after applying the radial static limit load) should be 0.051 mm (0.002 in) or less. The results of the evaluation of the static load test are indicated in TABLE 7 and TABLE 8 in each of which a case that the permanent deformation amount after applying the radial static limit load was 0.051 mm or less and satisfying the requirement of AS81934 standard is indicated with a sign "+", whereas a case that the permanent deformation amount after applying the radial static limit load exceeded 0.051 mm and not satisfying the requirement of AS81934 standard is indicated with a sign "−".

In each of the machinable liners (self-lubricating liners) 1 to 32, the permanent deformation amount after applying the radial static limit load was 0.51 mm or less, thus satisfying the requirement of AS81934 standard.

2. Oscillation Test Under Radial Load (Evaluation 2)

An oscillation test is performed at normal temperature, and at a high temperature that is a temperature of 163 degrees Celsius (+6 degrees Celsius/−0 degrees Celsius). AS81934 standard required in this oscillation test is that regarding the oscillation test at the normal temperature, the upper limit value of permissible wear amount of a liner after 1,000 cycles is 0.089 mm (0.0035 in), after 5,000 cycles is 0.102 mm (0.0040 in), and after 25,000 cycles is 0.114 mm (0.0045 in); and that regarding the oscillation test at the high temperature, the upper limit value of permissible wear amount of the liner after 25,000 cycles is 0.152 mm (0.0060 in).

At first, the oscillation test at normal temperature was performed as follows. A sleeve bearing 10 was set on the test jig T as shown in FIG. 2, and the load of 73.5 kN (16,500 lb) required in AS81934 standard as indicated in the right column of TABLE 6 was applied in the radial direction and maintained statically for 15 minutes. After 15 minutes, the amount of displacement in the dial gauge 42 was set to zero and the oscillation of the shaft 32 was started. The shaft member 32 was oscillated within an angular range of ±25 degrees. The oscillating movement of the shaft member 32 going from the angle position 0 degrees to +25 degrees and coming back to 0 degrees, and then going to −25 degrees and coming back again to 0 degrees was counted as 1 cycle. An oscillation rate should be set to 10 cycles per minute (10 CPM) or more. In the performed test, the oscillation rate was set to 20 cycles per minute. During this oscillation test, the wear amount was read from the dial gauge 42 and recorded. The oscillation test at high temperature was performed in a similar manner as in the oscillation test at normal temperature, except that the shaft 32 and the liner in the test jig T of FIG. 2 were maintained at the temperature of 163 degrees Celsius (+6 degrees Celsius/−0 degrees Celsius).

The results of the evaluation of the oscillation test are indicated in TABLE 7 and TABLE 8 in each of which a case that the wear amount of the liner after 25,000 cycles in the oscillation test at the normal temperature was 0.114 mm or less and satisfying the requirement of AS81934 standard is indicated with a sign "+", whereas a case that the wear amount of the liner after 25,000 cycles in the oscillation test at the normal temperature exceeded 0.114 mm and not satisfying the requirement of AS81934 standard is indicated with a sign "−". Further, in TABLE 7 and TABLE 8, a case that the wear amount of the liner after 25,000 cycles in the oscillation test at the high temperature was 0.152 mm or less and satisfying the requirement of AS81934 standard is indicated with a sign "+", whereas a case that the wear amount of the liner after 25,000 cycles in the oscillation test at the high temperature exceeded 0.152 mm and not satisfying the requirement of AS81934 standard is indicated with a sign "−".

The wear amount after 25,000 cycles in the oscillation test at normal temperature was 0.114 mm or less in the machinable liners 1 to 28 and 30 to 32, and thus satisfying the requirement of AS81934 standard. However, the wear amount after 25,000 cycles in the oscillation test at normal temperature in the machinable liner 29 exceeded 0.114 mm and did not satisfy the requirement of AS81933 standard. It is presumed that since the machinable liner 29 did not contain PTFE as the solid lubricant, thus could not obtain any sufficient lubricating property, and had a low wear resistance.

The wear amount after 25,000 cycles in the oscillation test at high temperature was 0.152 mm or less in the machinable liners 1 to 28 and 31, and thus satisfying the requirement of AS81934 standard. However, the wear amount after 25,000 cycles in the oscillation test at high temperature in the machinable liners 29, 30 and 32 exceeded 0.152 mm and did not satisfy the requirement of AS81934 standard. The machinable liner 30 formed by using the bisphenol A type epoxy resin composition and the machinable liner 32 formed by using the acrylic resin composition satisfied the requirement of AS81934 standard in the oscillation test at the normal temperature, but could not satisfy AS81934 standard in the oscillation test at the high temperature that was the severer test.

3. Oil Resistance Validation Test (Evaluation 3)

AS81934 standard required in this oil resistance validation test is that the upper limit value of permissible wear amount of a liner after the oil resistance validation test is 0.152 mm (0.0060 in). Sleeve bearings 10 respectively having the machinable liners manufactured as described above were immersed in each of oils of six kinds of "a" to "f", as indicated below, at temperature of 71 degrees Celsius±3 degrees Celsius for 24 hours, and then taken out from each of the oils, and subjected to the above-descripted oscillation test at the normal temperature within 30 minutes or less after being taken out from the oil. Note that, however, regarding the oil "b", the immersion was performed at temperature of 43 degrees Celsius±3 degrees Celsius for 24 hours; and regarding the oil "e", an oscillation test at the normal temperature was performed at a contact pressure condition that was 75% of that of the above-described oscillation test at the normal temperature.

Oil "a": Skydrol (trademark) 500B working fluid
Oil "b": MIL-DTL-5624 turbine fuel oil JP4 or JP5
Oil "c": MIL-PRF-7808 lubricating oil
Oil "d": MIL-PRF-5606 hydraulic oil
Oil "e": AS8243 anti-freezing agent
Oil "f": MIL-PRF-83282 working fluid As the results of the oil resistance validation test, the wear amount after 25,000 cycles in the oscillation test after the immersion in the oil for 24 hours was 0.152 mm or less regarding all the oils "a" to "f" in the machinable liners 1 to 28 and 30 to 32, and thus satisfying the requirement of AS81934 standard and indicated with the sign "+" in TABLE 7 and TABLE 8. On the other hand, in the machinable liner 29, the wear amount after 25,000 cycles in the oscillation test after the immersion in the oil for 24 hours exceeded 0.152 mm regarding all the oils "a" to "f", and thus not satisfying the requirement of AS81934 standard and indicated with the sign "−" in TABLE 8.

4. Oscillation Test at High Temperature (Evaluation 4)

An oscillation test was performed under similar conditions as that in the oscillation test under radial load (Evaluation 2) in accordance with AS81934 standard as described above, except that the temperatures of the shaft 32 and the liner in the test jig T of FIG. 2 were maintained at high temperatures of 180 degrees Celsius and 200 degrees Celsius, and the wear amounts after 25,000 cycles of the oscillation test at high temperatures were measured. Note that this oscillation test (Evaluation 4) was performed for the machinable liners 1 to 28 and 31 in which the results of the above-described Evaluations 1 to 3 were all "+". Further, regarding the machinable liner 31, the wear amount (mm) was measured only under a condition that the temperatures of the shaft 32 and the liner in the test jig T of FIG. 2 were maintained at 200 degrees Celsius. The results of the oscillation test at high temperature are indicated in TABLE 7 and TABLE 8.

In this oscillation test, in a case that the wear amount after 25,000 cycles of the oscillation test at 200 degrees Celsius in a machinable liner was 0.152 mm or less, the machinable liner was considered to have sufficient wear resistance at high temperature. As indicated in TABLE 7, in the machinable liners 1 to 28, the wear amount after 25,000 cycles of the oscillation test at 200 degrees Celsius was 0.152 mm or less, and the machinable liners 1 to 28 were considered to have sufficient wear resistance at high temperature. On the other hand, in the machinable liner 31, the wear amount after 25,000 cycles of the oscillation test at 200 degrees Celsius was 0.187 mm that exceeded 0.152 mm as indicated in TABLE 8, and the wear resistance at high temperature of the machinable line 31 was not sufficient.

Further, the self-lubricating liners formed of the resin composition in which the content amount of PTFE was in a range of 30% by weight to 60% by weight tended to have a high wear resistance at high temperature. For example, the machinable liners 1 to 4 in which the content amount of PTFE was in the range of 30% by weight to 60% by weight had a smaller wear amount than that of the machinable liners 5 to 8 in which the content amount of PTFE was outside the range of 30% by weight to 60% by weight, and thus the machinable liners 1 to 4 had higher wear resistance than that of the machinable liners 5 to 8. Furthermore, the self-lubricating liner formed of the resin composition containing the glass fiber tended to have a high wear resistance at high temperature. For example, the machinable liner 16 containing the glass fiber had a smaller wear amount than that of the machinable liner 17 which did not contain any glass fiber, and thus the machinable liner 16 had higher wear resistance than that of the machinable liner 17.

5. Measurement of Friction Coefficient (Evaluation 5)

An oscillation test was performed under similar conditions as that in the oscillation test under radial load (Evaluation 2) in accordance with AS81934 standard as described above, except that a torque detector was attached to the test jig T of FIG. 2 and that the temperatures of the shaft 32 and the liner in the test jig T were maintained at a high temperature of 200 degrees Celsius, and the torque after 25,000 cycles of the oscillation test was measured. The friction coefficients of the respective liners were calculated by using the obtained torque values and in accordance with the following formula.

$$(\text{Friction Coefficient}) = T/(F \times r)$$

T: Torque (Nm)
F: Radial load (N)
r: Radius of shaft (m)

Note that this measurement (Evaluation 5) was performed for the machinable liners 1 to 28 in which the results of the above-described Evaluations 1 to 3 were all "+", and for the machinable liners 30 to 32 in which the results of the above-described Evaluation 1 and Evaluation 2 under the normal temperature condition were "+". The results of this measurement are indicated in TABLE 7 and TABLE 8.

As indicated in TABLE 7 and TABLE 8, the friction coefficient of each of the machinable liners 30 to 32 was in a range of 0.037 to 0.051. On the other hand, the average value of the friction coefficients of the respective machinable liners 1 to 28 was 0.033 that is a value lower by 10% or more as compared with the value of the coefficient friction of each of the machinable liners 30 to 32. The reason for the above result is presumed that the resin composition in each of the machinable liners 1 to 28 contained PTFE as the solid lubricant in a range of 10% by weight to, maximally, 70% by weight. For example, the machinable liner 7 and the machinable liner 22 each containing a large amount of PTFE (machinable liner 7: 70% by weight, machinable liner 22: 60% by weight) both had a quite low friction coefficient of 0.019. Further, it is also presumed that PEEK as the particulate thermoplastic resin also had the effect of lowering the friction coefficient. The machinable liners 12 to 14 each containing 30% by weight of PTFE and further containing 25% by weight of PEEK had quite low friction coefficients of 0.024, 0.017 and 0.021, respectively.

<Table 7 and Table 8 (Following)—Legend>
"+": satisfying the requirement of AS81934 standard
"−": not satisfying the requirement of AS81934 standard
"N/A": data not obtained since the measurement was not performed

TABLE 7

| Machinable Liner | (Curing agent)/ (Epoxy compound) | Evaluation 1: Static Load Test | Evaluation 2: Oscillation test | | Evaluation 3: Oil Resistance Validation Test | Evaluation 4: Wear amount (mm) in Oscillation test at high temperature | | Evaluation 5: Friction Coefficient |
|---|---|---|---|---|---|---|---|---|
| | | | Normal Temperature | High Temperature | | 180° C. | 200° C. | |
| 1 | 1.18 | + | + | + | + | 0.011 | 0.017 | 0.043 |
| 2 | 1.18 | + | + | + | + | 0.004 | 0.009 | 0.026 |
| 3 | 1.18 | + | + | + | + | 0.010 | 0.025 | 0.045 |
| 4 | 1.18 | + | + | + | + | 0.022 | 0.033 | 0.042 |
| 5 | 1.00 | + | + | + | + | 0.085 | 0.123 | 0.022 |
| 6 | 1.19 | + | + | + | + | 0.040 | 0.071 | 0.025 |
| 7 | 1.17 | + | + | + | + | 0.040 | 0.077 | 0.019 |
| 8 | 1.18 | + | + | + | + | 0.103 | 0.139 | 0.065 |
| 9 | 1.17 | + | + | + | + | 0.021 | 0.033 | 0.038 |
| 10 | 1.03 | + | + | + | + | 0.024 | 0.039 | 0.041 |
| 11 | 0.83 | + | + | + | + | 0.035 | 0.068 | 0.044 |
| 12 | 1.00 | + | + | + | + | 0.022 | 0.036 | 0.024 |
| 13 | 1.00 | + | + | + | + | 0.018 | 0.031 | 0.017 |
| 14 | 1.00 | + | + | + | + | 0.020 | 0.034 | 0.021 |
| 15 | 1.62 | + | + | + | + | 0.029 | 0.055 | 0.036 |
| 16 | 1.00 | + | + | + | + | 0.013 | 0.027 | 0.040 |
| 17 | 1.00 | + | + | + | + | 0.068 | 0.123 | 0.047 |
| 18 | 1.00 | + | + | + | + | 0.077 | 0.111 | 0.025 |
| 19 | 0.67 | + | + | + | + | 0.076 | 0.142 | 0.039 |
| 20 | 1.50 | + | + | + | + | 0.025 | 0.040 | 0.032 |
| 21 | 1.50 | + | + | + | + | 0.040 | 0.063 | 0.044 |
| 22 | 1.51 | + | + | + | + | 0.055 | 0.086 | 0.019 |
| 23 | 1.29 | + | + | + | + | 0.035 | 0.056 | 0.028 |
| 24 | 0.95 | + | + | + | + | 0.038 | 0.060 | 0.027 |
| 25 | 0.91 | + | + | + | + | 0.036 | 0.060 | 0.025 |
| 26 | 1.22 | + | + | + | + | 0.022 | 0.041 | 0.030 |
| 27 | 1.00 | + | + | + | + | 0.026 | 0.045 | 0.028 |
| 28 | 1.00 | + | + | + | + | 0.029 | 0.047 | 0.027 |

TABLE 8

| Machinable Liner | (Curing agent)/ (Epoxy compound) | Evaluation 1: Static Load Test | Evaluation 2: Oscillation test | | Evaluation 3: Oil Resistance Validation Test | Evaluation 4: Wear amount (mm) in Oscillation test at high temperature | | Evaluation 5: Friction Coefficient |
|---|---|---|---|---|---|---|---|---|
| | | | Normal Temperature | High Temperature | | 180° C. | 200° C. | |
| 29 | 0.00 | + | − | − | − | N/A | N/A | N/A |
| 30 | N/A | + | + | − | + | N/A | N/A | 0.051 |
| 31 | N/A | + | + | + | + | N/A | 0.187 | 0.043 |
| 32 | N/A | + | + | − | + | N/A | N/A | 0.047 |

As indicated in TABLE 7 and TABLE 8, the machinable liners 1 to 28 manufactured by using the resin compositions 1 to 28 each containing the epoxy compound having the isocyanuric acid ring represented by the formula (1) and the solid lubricant satisfied the requirement of AS81934 standard in all of Evaluations 1 to 3, and had the wear amount after the oscillating test that was 0.152 mm or less in Evaluation 4. On the other hand, the machinable liner 29 manufactured by using the resin composition 29 not containing any solid lubricant and the machinable liners 30 to 32 each manufactured by using the resin composition containing the resin different from the epoxy compound having the isocyanuric acid ring did not satisfy the requirement of AS81934 standard in all one of Evaluations 1 to 3, or had the wear amount after the oscillating test that exceeded 0.152 mm in Evaluation 4.

6. Comparative Test of Surface Roughness of Base Surface

In order to evaluate separation resistance (adhesion property) of the self-lubricating liner (machinable liner) with respect to the inner circumferential surface of the sleeve bearing, test samples were manufactured in the following manner. Namely, before applying the resin composition on each of the sleeve bearings (width: 12.7 mm, outer diameter: 30.2 mm, inner diameter: 24.9 mm) used in the above-described evaluations, the inner circumferential surface of each of the sleeve bearings was roughened by the sand blasting process so that the inner circumferential surface had one of the four kinds of surface roughness as indicated in the following TABLE 9. Subsequently, the resin composition 2 used in the above-described tests was applied on the inner circumferential surface, and the heating was performed under a heating condition similar to that in the case of manufacturing the machinable liners used in the above-described tests, to thereby form a self-lubricating resin layer. The self-lubricating resin layer was subjected to cutting and grinding until the thickness of the self-lubricating resin layer became 0.25 mm, and the inner diameter of the sleeve bearing was finished to be 25.4 mm. Regarding the sleeve bearings each produced in the above-described manner and having the inner circumferential surface roughened to have one of the four kinds of surface roughness and provided with the machinable liner, a test (separation test) was performed under each of the following conditions "A" to "D", and the presence/absence of separation was visually checked.

Condition A: Verification of the separation of resin (machinable liner) under cutting of the sliding surface: Turning process was performed for the sleeve bearing so as to cut the machinable liner at a cutting depth of 0.3 mm, and the presence or absence of separation of the machinable liner during the process was observed.

Condition B: Verification of the separation of resin (machinable liner) after keeping the sleeve bearing in liquid nitrogen (−196 degrees Celsius) for 15 minutes: The presence or absence of separation of the machinable liner when the sleeve bearing was removed from the liquid nitrogen was observed.

Condition C: The sleeve bearing was subjected to an oscillation at the normal temperature with a contact pressure of 275 MPa in accordance with AS81934 standard described above, and the presence or absence of separation of the machinable liner up to 25,000 cycles was observed.

Condition D: The sleeve bearing subjected to an oscillation at a temperature of 163 degrees Celsius with a contact pressure of 275 MPa in accordance with AS81934 standard described above, and the presence or absence of separation of the machinable liner up to 25,000 cycles was observed.

TABLE 9 indicates the results of the separation test. In TABLE 9, a sign "+" means that no separation was present, whereas a sign "−" means that separation was present.

TABLE 9

| Base surface roughness | Performed test items | | | |
|---|---|---|---|---|
| Ra | A | B | C | D |
| 0.2 µm | + | + | + | + |
| 1.0 µm | + | + | + | + |
| 2.0 µm | + | + | + | + |
| 4.0 µm | + | + | + | + |

TABLE 9 LEGEND
"+": No separation was present.
"−": Separation was present.

For comparison, sleeve bearings, each provided with a machinable liner on the inner circumferential surface of which surface roughness was one of the four kinds of surface roughness as described above, were manufactured in a similar manner as described above, except that the machinable liner was formed by using a resin composition containing a thermoplastic resin instead of the thermosetting resin. The resin composition containing the thermoplastic resin was obtained in accordance to the method described in Example 1 of Japanese Patent Application Laid-open No. 2011-247408 corresponding to United States Patent Application Publications No. 2011/262059 and No. 2014/169713 by the applicant of the present teaching. Namely, 70% by weight of polyether ketone, 10% by weight of a PAN-based carbon fiber and 20% by weight of PTFE were mixed. Then, the obtained mixture was applied on the inner circumferential surface of the sleeve bearing by the injection molding to form a machinable liner, and the machinable liner was subjected to cutting and grinding until the machinable liner had a thickness of 0.25 mm. The test regarding the adhesion property was performed also for this machinable liner, and the results of the test is indicated in TABLE 10 wherein a sign "+" means that no separation was present, whereas a sign "−" means that separation was present.

TABLE 10

| Base surface roughness | Performed test items | | | |
|---|---|---|---|---|
| Ra | A | B | C | D |
| 0.2 µm | − | − | − | − |
| 1.0 µm | − | − | − | − |
| 2.0 µm | − | − | − | − |
| 4.0 µm | + | + | + | + |

TABLE 10 LEGEND
"+": No separation was present.
"−": Separation was present.

From the results indicated in TABLE 9, no separation was observed in the resin composition related to the present teaching in any cases of the surface roughness Ra of 0.2 µm to 4.0 µm. In contrast, in the case of forming the machinable liner from the resin composition using the thermoplastic resin, it is appreciated from the results indicated in TABLE 10 that any sufficient adhesion property could not be obtained unless the inner circumferential surface of the sleeve bearing was processed to have the surface roughness Ra of about 4.0 µm. From the above-described points, it is appreciated that the machinable liner formed by the resin composition according to the present teaching is capable of realizing a satisfactory adhesion property without depending on the roughness of the base surface, and that the process for roughening the base surface is not necessary for forming the self-lubricating liner in accordance with the present teaching.

7. Evaluation of Thickness of Self-Lubricating Liner

In order to evaluate the thickness of the self-lubricating liner, test samples were manufactured in the following manner. Namely, the resin compositions 2, 6, 14 and 32 used in the above-described tests (Evaluations 1 to 5) were applied by using a dispenser on the sleeve bearings (width: 12.7 mm, outer diameter: 30.2 mm, inner diameter: 24.9 mm) used in the above-described tests, so that each of the sleeve bearings was applied with one of the resin compositions 2, 6, 14 and 32 of which thickness was 0.3 mm, 0.5 mm, 0.7 mm, 1.0 mm or 2.0 mm. Next, the applied resin compositions were heated to be cured under the same condition as that in the formation of the machinable liners used in the above-described tests, so as to form a self-lubricating liner on the inner circumferential surface of each of the sleeve bearings. Regarding the sleeve bearings provided with the liners manufactured in such a manner, the presence or absence of any resin separation or resin cracking due to the shrinking during the thermal curing was visually evaluated. The results of the evaluation is indicated in TABLE 11 wherein a sign "+" means that neither resin separation nor resin cracking was present, whereas a sign "−" means that resin separation or resin cracking was present.

TABLE 11

| Thickness (mm) | Resin composition 2 | Resin composition 6 | Resin composition 14 | Resin composition 32 |
|---|---|---|---|---|
| 0.3 | + | + | + | + |
| 0.5 | + | + | + | + |
| 0.7 | + | + | + | + |

TABLE 11-continued

| Thickness (mm) | Resin composition 2 | Resin composition 6 | Resin composition 14 | Resin composition 32 |
|---|---|---|---|---|
| 1.0 | + | + | + | − |
| 2.0 | + | + | + | − |

TABLE 11 LEGEND
"+": Neither resin separation nor resin cracking was present.
"−": Resin separation or resin cracking was present.

Neither resin cracking nor resin separation was observed in the self-lubricating liners composed of the resin compositions 2, 6 and 14 in any cases of the thickness of 0.3 mm to 2.0 mm. In contrast, in the liner composed of the resin composition 32 that was the acrylic resin composition, the resin separation or resin cracking was confirmed at the thickness of 1.0 mm or more. It is appreciated from the results indicated in TABLE 11 that the resin compositions 2, 6 and 14 had a smaller compression during the thermal curing than the resin composition 32 as the acrylic resin composition, and were capable of forming a thick film while suppressing the resin separation and resin cracking as compared with the resin composition 32. Since the resin compositions 2, 6 and 14 are capable of forming a thick machinable liner, it is possible to widen the range for size adjustment through the cutting and grinding.

8. Influence of Particulate Thermoplastic Resin (PEEK) to Friction Coefficient and Wear Amount In order to evaluate the influence of PEEK as the particulate thermoplastic resin to the friction coefficient and wear amount in a case that the PEEK is contained in the resin composition, the test as explained below was performed for the machinable liners (self-lubricating liners) 1, 2, 3 and 4 respectively formed by the resin compositions 1, 2, 3 and 4 used in the above-described tests (Evaluations 1 to 5). The resin composition 1 is a resin composition containing 30% by weight of PTFE as the solid lubricant and 10% by weight of PEEK with the diameter of 23 μm; the resin composition 2 is a resin composition containing 30% by weight of PTFE and 10% by weight of PEEK with the diameter of 50 μm; the resin composition 3 is a resin composition containing 30% by weight of PTFE and does not contain any PEEK; and the resin composition 4 is a resin composition containing 40% by weight of PTFE and does not contain any PEEK.

Regarding each of the machinable liners 1 to 4 composed of the resin compositions 1 to 4, respectively, the frictions coefficients at 1,000 cycles, 5,000 cycles, 10,000 cycles, 15,000 cycles, 20,000 cycles and 25,000 cycles were obtained by using a method similar to that used in the measurement of friction coefficient as described above (Evaluation 5). The results of the measurement of friction coefficients are indicated in TABLE 12. Further, the wear amounts after 1,000 cycles, 5,000 cycles, 10,000 cycles, 15,000 cycles, 20,000 cycles and 25,000 cycles were obtained by using a method similar to that used in the oscillation test at the high temperature as described above (Evaluation 4). The results of the measurement of wear amounts are indicated in TABLE 13. Note that in the measurement of friction coefficient and the measurement of wear amount, the temperatures of the shaft 32 and the liner in the test jig T of FIG. 2 were maintained at 200 degrees Celsius.

TABLE 12

| | Friction Coefficient | | | |
|---|---|---|---|---|
| No. of cycles | Machinable Liner 1 PTFE 30 wt % PEEK (23 μm) 10 wt % | Machinable Liner 2 PTFE 30 wt % PEEK (50 μm) 10 wt % | Machinable Liner 3 PTFE 30 wt % PEEK 0 wt % | Machinable Liner 4 PTFE 40 wt % PEEK 0 wt % |
| 1,000 | 0.048 | 0.056 | 0.052 | 0.047 |
| 5,000 | 0.037 | 0.043 | 0.043 | 0.04 |
| 10,000 | 0.033 | 0.026 | 0.039 | 0.035 |
| 15,000 | 0.031 | 0.024 | 0.037 | 0.034 |
| 20,000 | 0.034 | 0.024 | 0.036 | 0.034 |
| 25,000 | 0.043 | 0.026 | 0.045 | 0.042 |

TABLE 13

| | Wear Amount (mm) | | | |
|---|---|---|---|---|
| No. of cycles | Machinable Liner 1 PTFE 30 wt % PEEK (23 μm) 10 wt % | Machinable Liner 2 PTFE 30 wt % PEEK (50 μm) 10 wt % | Machinable Liner 3 PTFE 30 wt % PEEK 0 wt % | Machinable Liner 4 PTFE 40 wt % PEEK 0 wt % |
| 1,000 | 0.004 | 0.000 | 0.009 | 0.001 |
| 5,000 | 0.008 | 0.002 | 0.018 | 0.007 |
| 10,000 | 0.012 | 0.004 | 0.02 | 0.014 |
| 15,000 | 0.014 | 0.007 | 0.022 | 0.019 |
| 20,000 | 0.017 | 0.009 | 0.025 | 0.026 |
| 25,000 | 0.017 | 0.009 | 0.025 | 0.033 |

As indicated in TABLE 12, at 25,000 cycles, each of the machinable liners 1 and 2 containing 30% by weight of PTFE and further containing 10% by weight of PEEK had a lower friction coefficient than that of the machinable liner 3 containing 30% by weight of PTFE but containing no PEEK. Even comparing the machinable liners 1 and 2 with the machinable liner 4 containing 40% by weight of PTFE but containing no PEEK, the friction coefficient of the machinable liner 1 at 25,000 cycles were similar to that of the machinable liner 4; and the friction coefficient of the machinable liner 2 at 25,000 cycles was lower than that of the machinable liner 4. From these results, PEEK as the particulate thermoplastic resin is presumed to have the effect of lowering the friction coefficient at a high temperature (200 degrees Celsius), similarly to the effect obtained by the solid lubricant.

As indicated in TABLE 13, each of the machinable liners 1 and 2 containing PTFE and further containing PEEK had smaller wear amount at 25,000 cycles than those of the machinable liners 3 and 4 each containing PTFE but containing no PEEK. Further, the tensile strength of PTFE is in a range of 13.7 MPa to 34.3 MPa (literature data), and the tensile strength of PEEK is 92 MPa (literature data) that is greater than the tensile strength of PTFE. From these results and facts, it is presumed that PEEK as the particulate thermoplastic resin has an effect of improving the wear resistance.

9. Influence of Particulate Thermoplastic Resin (PEEK) to Glass Transition Point (Tg)

Figure 3:
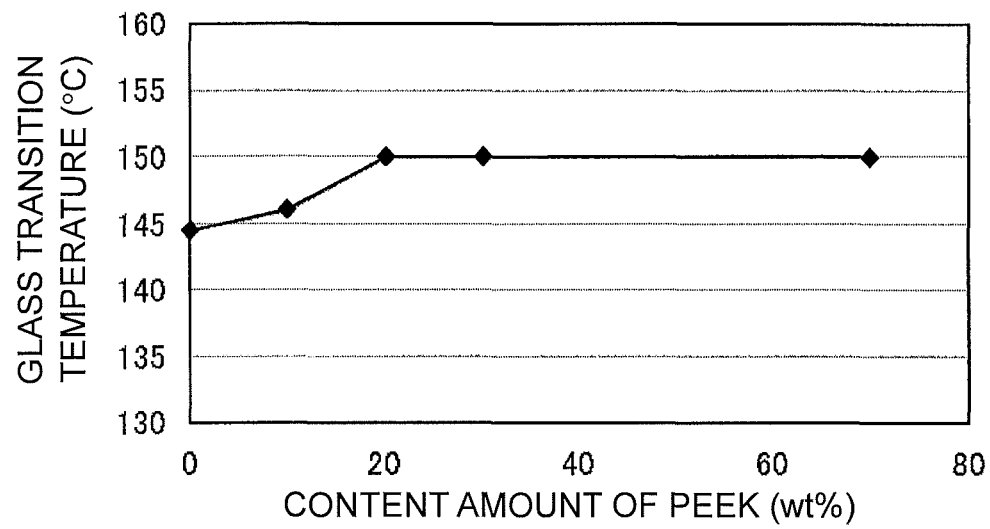
FIG. 3 is a graph indicating a relationship between the content amount of polyether ether ketone (PEEK) in a thermosetting resin composition and the glass-transition temperature of a cured product.

In order to evaluate the influence of PEEK as the particulate thermoplastic resin to the glass transition point in a case that PEEK is contained in the resin composition, test samples containing PEEK in different content amounts were prepared in the following manner, and the glass transition point of each of the test samples was measured by the Thermo Mechanical Analysis method (TMA method). The results of the measurement of the glass transition points are indicated in FIG. 3.

<Preparation of Measurement Samples>

With the composition of the resin composition 1 used in the above-described tests (Evaluations 1 to 5) as the reference, five kinds of resin compositions were prepared by changing the amount of PEEK, relative to the entire amount of the resin composition 1, to be 0% by weight, 10% by weight, 20% by weight, 30% by weight and 70% by weight. The obtained five kinds of resin compositions were heated under a heating condition similar to that in the case of manufacturing the machinable liners used in the above-described tests, to thereby form columnar-shaped measurement samples having a diameter of 5 mm and a length of 10 mm. The parallelism of end surfaces in the measurement samples was within ±0.025 mm.

<Method for Measuring Glass Transition Temperature (Tg)>

(1) The measurement sample (test piece), a detection rod and a surface of a sample stand were cleaned, and the measurement sample was placed vertically on the test stand while causing the measurement sample to contact the sample stand as closely as possible.

(2) The detection rod was placed at the center of the measurement sample applying 49 mN (5 gf).

(3) Compressive load was applied statically to the tip of the detection rod at room temperature, the change in thermal expansion of the measurement sample was measured while raising the temperature from the room temperature to 300 degrees Celsius, and the inflection point of the obtained thermal expansion curve was defined as the glass transition temperature. The force applied to the tip of the detection rod was 98 mN (10 gf), and the temperature raising speed was 5 degrees Celsius per minute. In the measurement, the strain was eliminated in the first run, and then the change in thermal expansion was measured in the second run; for each of the different samples, the measurement was repeated three times and the average value of the measurements was obtained.

As indicated in FIG. 3, in a case that PEEK was contained in the resin composition, the glass transition temperature was raised as the content amount of PEEK was increased, and reached 150 degrees Celsius in a case that the content amount of PEEK was 20% by weight. Further, even in cases wherein the content amounts of PEEK were increased to 30% by weight and 70% by weight respectively, the glass transition temperature did not lower, and was substantially constant at 150 degrees Celsius. The glass transition temperature is one of the indexes indicating the heat resistance of a resin. Generally, the higher the glass transition temperature of a resin is, the higher the heat resistance of the resin is. From the results indicated in FIG. 3, it is conceived that PEEK has a function to improve the heat resistance of the resin composition. On the other hand, in a case that the content amount of PEEK in the resin composition is too great, the film forming property is lowered. From these viewpoints, the content amount of PEEK in the resin composition is preferably 30% by weight or less. Further, the content amount of PEEK in the resin composition is more preferably in a range of 20% by weight to 30% by weight, from the points that the effect of increasing the glass transition temperature is saturated at the content amount of PEEK of 20% by weight or more; and that a glass transition temperature of 150 degrees Celsius, that can secure the heat resistance of which extent is substantially same as the heat resistance of the polyether ketone-based resin liner required for the aircraft application and disclosed in Patent Literature 3, can be obtained.

10. Evaluation of Glass Fiber

In order to evaluate the influence of the difference in kinds of glass fibers to the resin composition, regarding each of the self-lubricating liners (machinable liners) 12, 13 and 14 composed of the resin compositions 12, 13 and 14 respectively used in the above-described tests (Evaluations 1 to 5), the friction coefficients at 1 cycle, 100 cycles, 1,000 cycles, 5,000 cycles, 10,000 cycles, 15,000 cycles, 20,000 cycles and 25,000 cycles were obtained by using a method similar to that used in the measurement of friction coefficients as described above (Evaluation 5). In this measurement, the temperatures of the shaft 32 and the liner in the test jig T of FIG. 2 were maintained at 200 degrees Celsius. As the glass fiber, the machinable liner 12 used a circular cross-sectional glass fiber (average fiber length: 80 μm×average diameter φ11 μm), the machinable liner 13 used a circular cross-sectional glass fiber (average fiber length: 80 μm×average diameter (6.5 μm), and the machinable liner 14 used an irregular shape (oblong) cross-sectional glass fiber (cross sectional shape: 7 μm×28 μm, aspect ratio: 1:4, average fiber length: 100 μm). The results of the measurement of the friction coefficients are indicated in TABLE 14 as follows.

TABLE 14

| | Friction Coefficient | | |
| --- | --- | --- | --- |
| No. of cycles | Machinable Liner 12 | Machinable Liner 13 | Machinable Liner 14 |
| 1 | 0.055 | 0.049 | 0.049 |
| 100 | 0.052 | 0.048 | 0.039 |
| 1,000 | 0.053 | 0.045 | 0.025 |
| 5,000 | 0.038 | 0.03 | 0.021 |
| 10,000 | 0.026 | 0.019 | 0.02 |
| 15,000 | 0.023 | 0.02 | 0.018 |
| 20,000 | 0.02 | 0.018 | 0.022 |
| 25,000 | 0.021 | 0.017 | 0.024 |

The torque value in the oscillation test is gradually lowered as the number of cycles is increased, and becomes stable at a certain number of cycles. The friction coefficient calculated from the torque value in accordance with the above-described formula also has a similar tendency. As indicated in TABLE 14, the machinable liner 14 using the irregular shape cross-sectional glass fiber reached a substantially stable value of the friction coefficient at the number of cycles of 1,000. On the other hand, the machinable liners 12 and 13 each using the circular cross-sectional glass fiber each reached a stable value of the friction coefficient at the number of cycles of 10,000 or more. In such a manner, in the machinable liner 14 using the irregular shape cross-sectional glass fiber, the values of torque and friction coefficient became stable at an earlier stage with a smaller number of cycles than those of the machinable liners 12 and 13 each using the circular cross-sectional glass fiber. From these results, it is presumed that a self-lubricating liner containing the irregular shape cross-sectional glass fiber is more conformable to a mating sliding member than another self-lubricating liner containing the circular cross-sectional glass fiber, and stabilizes the friction coefficient of the self-lubricating liner at an early stage, thereby realizing a stable sliding torque at the initial stage of sliding movement.

11. Measurement of Infrared Absorption Spectrum

Figure 8:
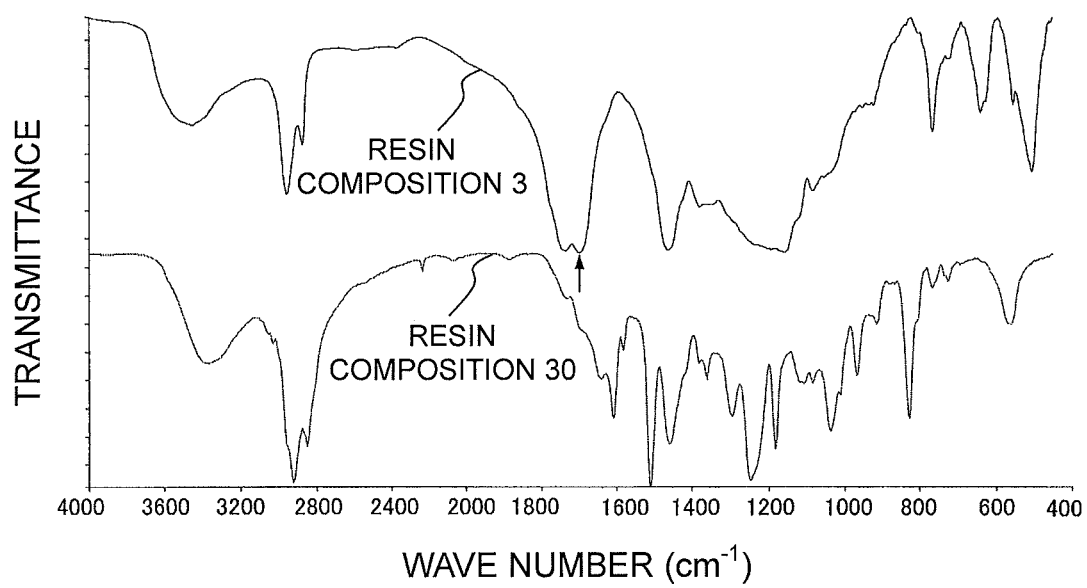
FIG. 8 indicates infrared absorption spectra of cured products of thermosetting resin compositions 3 and 30 prepared in Examples.

Regarding resins (cured products) obtained by subjecting the resin compositions 3 and 30 used in the above-described tests (Evaluations 1 to 5) to the thermal curing under a condition similar to that during the manufacturing the above-described machinable liners, the infrared absorption spectra (FT-IR) of the resins (cured products) were measured. The results of measurement of the infrared absorption spectra (FT-IR) are indicated in FIG. 8. It is well-known that the absorption peak by the C=O bond in the isocyanuric acid ring appears in a range of 1,690 cm$^{-1}$ to 1,720 cm$^{-1}$. Since the resin composition related to the present teaching contains the epoxy compound having the isocyanuric acid ring, the resin composition shows an absorption peak in the same range.

In the infrared absorption spectrum of the resin composition 3, an absorption peak (1,701 cm$^{-1}$) derived from the isocyanuric acid ring was confirmed, as indicated by an arrow in FIG. 8. On the other hand, this absorption peak (1,701 cm$^{-1}$) could not be confirmed in the infrared absorption spectrum of the bisphenol A type epoxy resin of the resin composition 30. As the epoxy resin formed of the epoxy compound having the isocyanuric acid ring represented by the formula (1) has the absorption peak in the range of 1,690 cm$^{-1}$ to 1,720 cm$^{-1}$, this epoxy resin can be distinguished from epoxy resins of the different kinds by using the measurement of infrared absorption spectrum, and can be identified.

<Manufacture of Thermosetting Resin Compositions 33 to 39>

[Resin Compositions 33 to 39]

Resin compositions 33 to 39 are each a resin composition using an epoxy resin compound having the isocyanuric acid ring represented by the above-described formula (1). There were prepared resin compositions 33 to 39 in a liquid form so that each of the liquid resin compositions 33 to 39 had the composition of resin composition as shown in TABLE 15 as follows by uniformly mixing: an epoxy resin compound having the isocyanuric acid ring represented by the above-described formula (1), and further, as necessary, a curing agent, a cure accelerator, a solid lubricant, a thermoplastic resin, glass fiber and fumed silica. Note that in TABLE 15, an epoxy compound "A" is a mixture of the compound represented by the formula (2) as described above (TEPIC (trademark)) and the addition reaction product of TEPIC (trademark) and the propionic acid anhydride. Note further that in TABLE 15, the substances represented by the abbreviations and the like of the components in the resin composition are similar to those in TABLE 1 and TABLE 2 described above.

<Manufacture of Self-Lubricating Liners 33 to 39>

Self-lubricating liners (machinable liners) 33 to 39 were produced by using the resin compositions 33 to 39 with a method similar to that used in the manufacture of the above-described self-lubricating liners (machinable liners) 1 to 32. In the machinable liners 33 to 39, cutting and grinding were performed so that each of the machinable liners 33 to 39 had a thickness of 0.25 mm.

The machinable liners 33 to 39 were subjected to performance evaluation by Evaluations 1 to 5 as explained above. TABLE 16 indicates the results of Evaluations 1 to 5. Note that, together with these evaluations, TABLE 16 also indicates the weight ratio of the curing agent to the epoxy compound having the isocyanuric acid ring, namely "(curing agent)/(epoxy compound having isocyanuric ring)" in each of the epoxy compositions 33 to 39.

<Performance Evaluation of Machinable Liners 33 to 39>

1. Radial Static Limit Load (Static Load Test) (Evaluation 1)

The radial static limit load test was performed for the machinable liners 33 to 39, in a method similar to that performed for the machinable liners 1 to 32 as described above, and the machinable liners 33 to 39 were evaluated with the evaluation criterion similar to that by which the machinable liners 1 to 32 were evaluated. Namely, a case wherein the permanent deformation amount after applying the radial static limit load was 0.051 mm or less and thus satisfying the requirement of AS81934 standard was judged with the sign "+", whereas a case wherein the permanent deformation amount after applying the radial static limit load exceeded 0.051 mm and thus not satisfying the requirement of AS81934 standard was judged with the sign "−". The results of the evaluation of the static load test are indicated in TABLE 16.

In each of the machinable liners 33 to 39, the permanent deformation amount after applying the radial static limit load was 0.51 mm or less, thus satisfying the requirement of AS81934 standard.

2. Oscillation Test Under Radial Load (Evaluation 2)

The oscillation test under radial load was performed for the machinable liners 33 to 39, in a method similar to that performed for the machinable liners 1 to 32 as described above, and the machinable liners 33 to 39 were evaluated with the evaluation criterion similar to that by which the machinable liners 1 to 32 were evaluated.

The results of the evaluation of the oscillation test are indicated in TABLE 16. Namely, in TABLE 16, a case that the wear amount of the liner after 25,000 cycles in the

TABLE 15

COMPOSITION OF RESIN COMPOSITIONS (% by weight)

| Resin Composition | Epoxy Compound [1] A | Curing Agent [2] c | Cure Accelerator [3] e | Solid Lubricant [5] EMI | PTFE | MC | Thermoplastic resin [6] PEEK (1) | PEEK (2) | Glass Fiber [7] GF (1) | Dibasic sodium phosphate | Fumed Silica [8] |
|---|---|---|---|---|---|---|---|---|---|---|---|
| 33 | 32 | 8 | 8 | – | 35 | 10 | – | – | 7 | – | – |
| 34 | 43 | 18.1 | – | 0.9 | 30 | – | – | – | 7 | – | 1 |
| 35 | 43 | 18.1 | – | 0.9 | 20 | – | 10 | – | 7 | – | 1 |
| 36 | 36 | 15.3 | – | 0.7 | 40 | – | – | – | 7 | – | 1 |
| 37 | 11.9 | 2.9 | – | 0.2 | 80 | – | – | – | 4 | – | 1 |
| 38 | 68.7 | 17 | – | 1.3 | 10 | – | – | – | – | – | 3 |
| 39 | 44 | 44 | – | 1 | 5 | – | – | – | 5 | – | 1 | oscillation test at the normal temperature was 0.114 mm or less and thus satisfying the requirement of AS81934 standard is indicated with a sign "+", whereas a case that the wear amount of the liner after 25,000 cycles in the oscillation test at the normal temperature exceeded 0.114 mm and thus not satisfying the requirement of AS81934 standard is indicated with a sign "−". Further, in TABLE 16, a case that the wear amount of the liner after 25,000 cycles in the oscillation test at the high temperature was 0.152 mm or less and thus satisfying the requirement of AS81934 standard is indicated with a sign "+", whereas a case that the wear amount of the liner after 25,000 cycles in the oscillation test at the high temperature exceeded 0.152 mm and thus not satisfying the requirement of AS81934 standard is indicated with a sign "−".

The wear amount after 25,000 cycles in the oscillation test at normal temperature was 0.114 mm or less in the machinable liners 33 to 36, and thus satisfying the requirement of AS81934 standard. However, the wear amount after 25,000 cycles in the oscillation test at normal temperature in the machinable liners 37 to 39 exceeded 0.114 mm and did not satisfy the requirement of AS81934 standard. It is presumed that since the content amount of PTFE as the solid lubricant exceeded 70% by weight in the machinable liner 37, the content amounts of the epoxy compound and the curing agent were low in the machinable liner 37, and thus the mechanical strength was lowered in the machinable liner 37. Further, in the machinable liner 39, the content amount of PTFE as the solid lubricant was less than 10% by weight, and it is presumed that that the machinable liner 39 could not obtain any sufficient lubricating property and had a low wear resistance. Furthermore, although the content amount of PTFE as the solid lubricant in the resin composition prepared in the machinable liner 38 was 10% by weight, the weight ratio of the curing agent relative to the epoxy compound having the isocyanuric acid ring was 0.25 that was a low value, and it is presumed that the machinable liner 38 could not obtain any sufficient wear resistance.

The wear amount after 25,000 cycles in the oscillation test at high temperature exceeded 0.152 mm in the machinable liners 33 to 39, and thus not satisfying the requirement of AS81934 standard. Although the machinable liners 33 to 36 satisfied the requirement of AS81934 standard in the oscillation test at the normal temperature, but could not satisfy the requirement of AS81934 standard in the oscillation test at the high temperature that was the severer test. The reason for the results in the oscillation test at high temperature is presumed that the machinable liners 33 to 36 could not obtain any sufficient heat resistance due to the low weight ratio of the curing agent relative to the epoxy compound having the isocyanuric acid ring.

3. Oil Resistance Validation Test (Evaluation 3)

The oil resistance validation test was performed for the machinable liners 33 to 39, with a method similar to that performed for the machinable liners 1 to 32 as described above, and the machinable liners 33 to 39 were evaluated with the evaluation criterion similar to that by which the machinable liners 1 to 32 were evaluated.

As the results of the oil resistance validation test, the wear amount after 25,000 cycles in the oscillation test after the immersion in the oil for 24 hours was 0.152 mm or less in the machinable liners 34 to 36, and thus satisfying the requirement of AS81934 standard and indicated with the sign "+" in TABLE 16. On the other hand, in the machinable liners 33 and 37 to 39, the wear amount after 25,000 cycles in the oscillation test after the immersion in the oil for 24 hours exceeded 0.152 mm, and thus not satisfying the requirement of AS81934 standard and indicated with the sign "−" in TABLE 16.

4. Oscillation Test at High Temperature (Evaluation 4)

As described above, this test (Evaluation 4) was performed for the machinable liners in which the results of the above-described Evaluations 1 to 3 were all "+". Namely, this test was not performed for the machinable lines 33 to 39 in each of which the result of any one of Evaluations 1 to 3 was "−".

5. Measurement of Friction Coefficient (Evaluation 5)

The measurement of friction coefficients was performed for the machinable liners 33 to 36, in a method similar to that performed for the machinable liners 1 to 32 as described above. Note that this measurement (Evaluation 5) was performed for the machinable liners 33 to 36 in which the results of the above-described Evaluation 1 and Evaluation 2 under the normal temperature condition were "+". The results of this measurement are indicated in TABLE 16.

As indicated in TABLE 16, the friction coefficient of each of the machinable liners 33 to 36 was in a range of 0.037 to 0.051. On the other hand, as indicated in TABLE 7, the average value of the friction coefficient of each of the machinable liners 1 to 28 was 0.333 that is a value lower by 10% or more as compared with the value of the coefficient friction of each of the machinable liners 33 to 36. It is presumed that the resin composition in each of the machinable liners 1 to 28 contained PTFE as the solid lubricant in a range to 10% by weight maximally to 70% by weight.

TABLE 16

| Machinable Liner | (Curing agent)/ (Epoxy compound) | Evaluation 1: Static Load Test | Evaluation 2: Oscillation test | | Evaluation 3: Oil Resistance Validation Test | Evaluation 4: Wear amount (mm) in Oscillation test at high temperature | | Evaluation 5: Friction Coefficient |
|---|---|---|---|---|---|---|---|---|
| | | | Normal Temperature | High Temperature | | 180° C. | 200° C. | |
| 33 | 0.50 | + | + | − | − | N/A | N/A | 0.039 |
| 34 | 0.42 | + | + | − | + | N/A | N/A | 0.045 |
| 35 | 0.42 | + | + | − | + | N/A | N/A | 0.041 |
| 36 | 0.43 | + | + | − | + | N/A | N/A | 0.031 |
| 37 | 0.24 | + | − | − | − | N/A | N/A | N/A |
| 38 | 0.25 | + | − | − | − | N/A | N/A | N/A |
| 39 | 1.00 | + | − | − | − | N/A | N/A | N/A |

LEGEND
"+": satisfying the requirement of AS81934 standard
"−": not satisfying the requirement of AS81934 standard
"N/A": data not obtained since the measurement was not performed In the self-lubricating liner (machinable liner) as described above, the resin composition related to the present teaching was applied to the sleeve bearing with the shape as shown in FIG. 1. However, the application of the resin composition related to the present teaching is not limited to the sleeve bearing of this shape, and it is possible to apply the resin composition related to the present teaching to sliding members having a variety of shapes and structures.

<Spherical Bearing>

Figure 4:
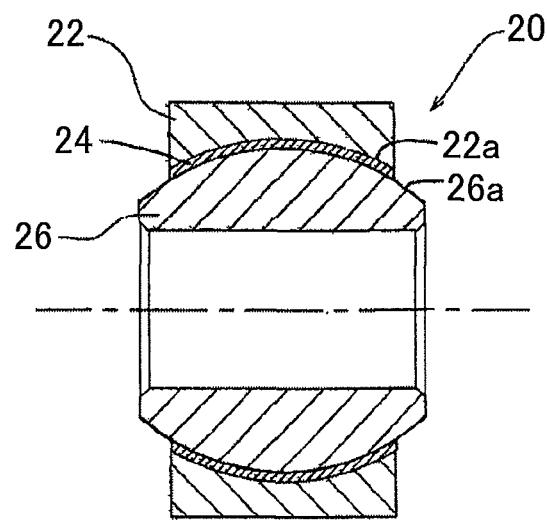
FIG. 4 is a cross-sectional view of the structure of a spherical bearing with a self-lubricating liner made from a resin composition related to the present teaching.

As shown in FIG. 4, a spherical bearing 20 includes an outer race (outer ring) 22 having a concave spherical inner circumferential surface 22a, an inner race (inner ring) 26 having a convex spherical outer circumferential surface 26a, and a machinable liner 24 formed between the inner circumferential surface 22a and the outer circumferential surface 26a. The thickness of the liner may be, for example, about 0.25 mm.

Figure 5A:
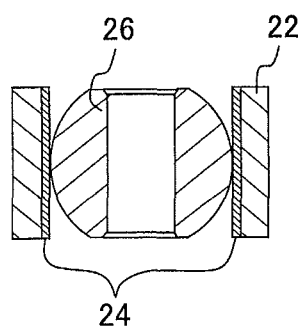
FIGS. 5A to 5C are views explaining a manufacturing process of the spherical bearing with the self-lubricating liner made from the resin composition related to the present teaching.
Figure 5B:
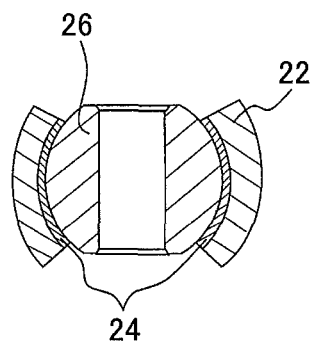
Figure 5C:
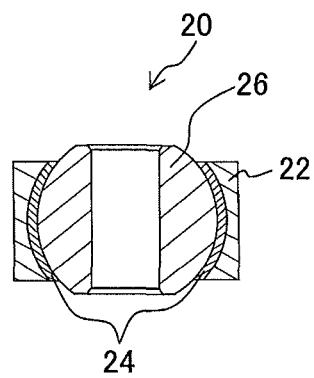

The spherical bearing 20 can be manufactured by a process using swage process, for example, as shown in FIG. 5A to FIG. 5C. At first, a resin composition 2 (24) prepared in the above-described tests (Evaluations 1 to 5) is applied on the inner circumferential surface (sliding surface) 22a of the outer race (body) 22, and the resin composition is primarily cured by being heated. Accordingly, the machinable liner (24) is formed. Then, the inner race 26 is inserted into the outer race 22 (FIG. 5A). Next, by the swage process, the outer race 22 is plastically deformed with a press so as to follow the outer circumferential surface of the inner race 26 (FIG. 5B). Then, the machinable liner 24 is secondarily cured by being heated. Subsequently, the outside of the outer race 22 is finished by cutting process to thereby make it possible to complete the spherical bearing 20 (FIG. 5C).

After the resin composition has been primarily cured, the resin composition is allowed to follow the deformation of the outer race in the swage process. Accordingly, it is possible to form a liner having a uniform thickness in the spherical bearing.

<Rod End Spherical Bearing>

Figure 6A:
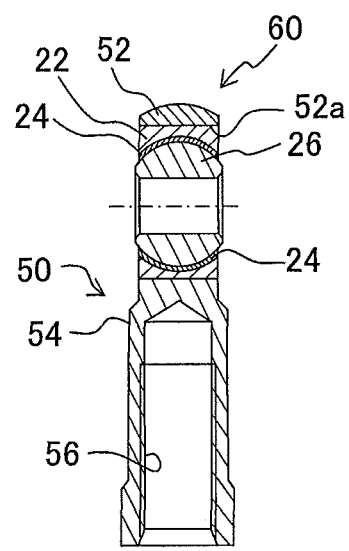
FIG. 6A is a longitudinal sectional view of a rod end spherical bearing into which the spherical bearing related to the present teaching is incorporated.
Figure 6B:
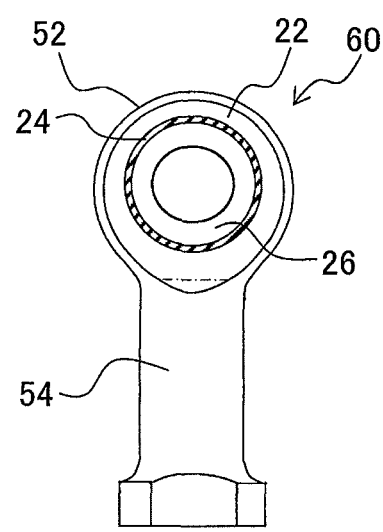
FIG. 6B is a lateral sectional view of the same.

FIGS. 6A and 6B each show an exemplary rod end spherical bearing 60 in which the spherical bearing 20 is incorporated into a rod end body 50. The rod end body 50 is composed of a head portion 52 having a through hole 52a into which the spherical bearing 20 is incorporated, and a shaft portion 54 provided with a female or male thread 56. The shaft portion 54 is a body in a substantially cylindrical shape extending from the head portion 52 in a radial direction of the through hole 52a. After the spherical bearing 20 is inserted in the through hole 52a, a V-shaped groove (not shown) formed at the edge of the through hole 52a is swaged, so that the spherical bearing 20 is fixed to the rod end body 50.

<Reamer Bolt>

Figure 7:
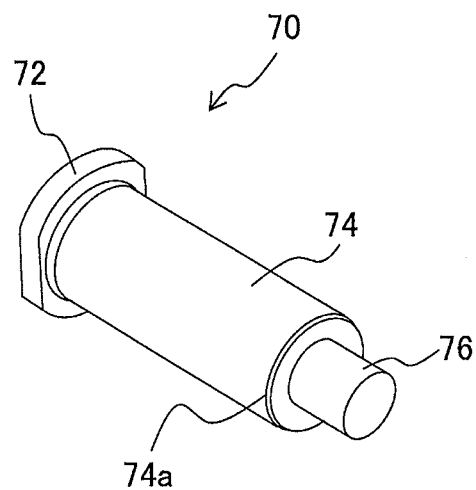
FIG. 7 is a view of an outer appearance of a reamer bolt with a self-lubricating liner which is made from the resin composition related to the present teaching and formed on a shaft surface of the reamer bolt.

A reamer bolt 70 as shown in FIG. 7 includes a main body portion composed of a head portion 72, a shaft portion 74 having a large diameter and a male thread portion 76 having a small diameter, and a machinable liner 74a provided on the outer circumference surface (sliding surface) of the shaft portion 74. The machinable liner 74a is formed by uniformly applying and curing any one of the resin compositions as described above with the above-described method. The main body portion of the reamer bolt 70 is formed, for example, by SUS630 stainless steel. The thickness of the machinable liner 74a may be in the range of about 0.25 mm to about 0.5 mm.

The reamer bolt 70 is used in important connection portions transmitting a high torque, such as a propeller shaft of vessels or ships, a flight control surface (movable vane) of aircraft, and a connecting rod of automobile engines. The reamer bolt 70 used in such important connection portions is required to be fitted to a bolt hole with high precision without any play. Therefore, the shaft portion 74 of the reamer bolt 70 is finished with high precision, but even so, it is advantageous that the size adjustment of the bolt can be performed at the time of assembly. Since the reamer bolt related to the present teaching includes the machinable liner 74a, the user can easily adjust the size of outer diameter of the shaft portion (body portion) even after curing of the resin. Further, the reamer bolt related to the present teaching includes the self-lubricating machinable liner 74a on the shaft portion 74, and thus even when the bolt is inserted or removed at the time of assembly or disassembly, any galling and the like do not occur, resulting in a reamer bolt 70 with a long service life.

Although the present teaching has been explained by the examples, the present teaching is not limited to the examples and can be substantiated in various embodiments and aspects within the scope of the claims. For example, in the specific examples as described above, the self-lubricating liner is formed on the inner circumferential surface of an outer race of a spherical bearing and a rod end spherical bearing. The self-lubricating liner, however, may be formed on the outer circumferential surface of an inner race of the spherical bearing and the rod end spherical bearing. Further, although the explanation has been made by citing the spherical bearing, the rod end spherical bearing and the reamer bolt as examples of the sliding member, the present teaching is not limited to these bearings and bolt, and the present teaching can be applied to any sliding member provided that the sliding member includes the self-lubricating liner. Especially, although the explanation has been made in the above embodiment by citing the sliding member used for the rotary motion of a member or part, the sliding member related to the present teaching includes not only that for the rotary motion but also a sliding member used for sliding motion, of a member or part, in any direction such as translational motion (linear motion), oscillating motion, and any combination thereof.

As described above, the resin composition related to the present teaching can be used as the self-lubricating liner by being applied on the sliding surface of the sliding member and being cured by being heated. Since the adhesion of the cured resin composition to the base surface is extremely strong, no process is required to roughen the base surface. Therefore, a relatively large amount of PTFE can be contained while ensuring the safety of work, and also the equipment cost can be reduced. The self-lubricating liner manufactured as described above can be formed in various sliding members including sliding bearings such as a sleeve bearing and a spherical bearing. By making the sliding member have the self-lubricating liner made from the resin composition related to the present teaching, the surface of the liner can be subjected to the cutting, the grinding, and the like, which makes it possible to perform the fine-adjustment of inner diameter size of the bearing when the shaft is installed by an end-user. Therefore, the resin composition related to the present teaching and the sliding member provided with the self-lubricating liner made from the resin composition related to the present teaching are very useful in wide fields such as vessels, aircraft, automobiles, electronic products, home electric appliances, and the like.

What is claimed is:

1. A sliding member comprising:
a sliding surface; and
a self-lubricating liner formed on the sliding surface by a thermosetting resin composition including:
a solid lubricant;
a curing agent; and
an epoxy compound having an isocyanuric acid ring represented by the following formula (1):

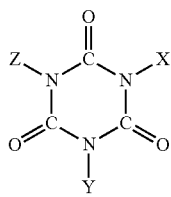

(1)

wherein
X is a group containing an epoxy ring,
Y is an atom of H, a group composed only of C and H, a group composed only of C, H and O containing no epoxy ring, or a group containing an epoxy ring, and
Z is an atom of H, a group composed only of C and H, or a group composed only of C, H and O containing no epoxy ring,
and
a weight ratio (M/N) of a weight (M) of the curing agent to a weight (N) of the epoxy compound having the isocyanuric acid ring is in a range of (M/N)=0.65 to 1.65.

2. The sliding member according to claim 1, wherein the sliding member is a sliding bearing.

3. The sliding member according to claim 2, wherein the sliding bearing is a spherical bearing.

4. The sliding member according to claim 1, wherein the sliding member includes a head portion, a shaft portion, and a thread portion, and the self-lubricating liner is formed on an outer circumferential surface of the shaft portion.

5. The sliding member according to claim 1, wherein the solid lubricant is contained in an amount of 10% by weight to 70% by weight with respect to the entire amount of the thermosetting resin composition.

6. The sliding member according to claim 1, wherein the solid lubricant contains polytetrafluoroethylene.

7. The sliding member according to claim 6, wherein the polytetrafluoroethylene is contained in an amount of 10% by weight to 70% by weight with respect to the entire amount of the thermosetting resin composition.

8. A sliding member comprising:
a sliding surface; and
a self-lubricating liner formed on the sliding surface by a thermosetting resin composition including:
a solid lubricant;
a curing agent; and
a mixture of epoxy compounds having an isocyanuric acid ring represented by the following formula (1):

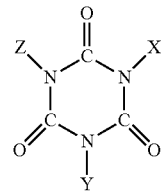

(1)

wherein the mixture includes:
an epoxy compound in which each of the X and Y in the formula (1) is the group containing the epoxy ring, and Z in the formula (1) is an atom of H, a group composed only of C and H, or a group composed only of C, H and O containing no epoxy ring, and
an epoxy compound in which only the X in the formula (1) is the group containing the epoxy ring, and each of Y and Z in the formula (1) is an atom of H, a group composed only of C and H, or a group composed only of C, H and O containing no epoxy ring, and
a weight ratio (M/N) of a weight (M) of the curing agent to a weight (N) of the mixture is in a range of (M/N)=0.65 to 1.65.

9. The sliding member according to claim 1, wherein the epoxy compound having the isocyanuric acid ring is at least one selected from the group consisting of:
an addition reaction product of 1,3,5-tris(2,3-epoxypropyl)-1,3,5-triazine-2,4,6(1H, 3H, 5H)-trione and propionic acid anhydride;
1-methyl-3,5-bis-oxiranyl methyl-[1,3,5]triazine-2,4,6-trione;
acrylic acid 2-(3,5-bis-oxiranyl methyl-2,4,6-trioxo-[1,3,5]triazine-1-yl)ethyl ester; and
2-methyl-acrylic acid 2-(3,5-bis-oxiranyl methyl-2,4,6-trioxo-[1,3,5]triazine-1-yl)ethyl ester.

10. The sliding member according to claim 1, wherein the thermosetting resin composition further comprises a thermoplastic resin.

11. The sliding member according to claim 10, wherein the thermoplastic resin is polyether ether ketone.

12. The sliding member according to claim 1, wherein the curing agent is acid anhydride.

13. The sliding member according to claim 12, wherein the curing agent is at least one selected from the group consisting of:
methyltetrahydrophthalic acid anhydride;
tetrapropenylsuccinic anhydride;
ester of aliphatic acid dianhydride and polyalkylene glycol;
methylbicyclo[2,2,1]heptane-2,3-dicarboxylic anhydride; and
1,2,4-benzene tricarboxylic 1,2-anhydride.

14. A sliding member comprising:
a sliding surface; and
a self-lubricating liner formed on the sliding surface by a thermosetting resin composition including:
a solid lubricant;
glass fiber; and
an epoxy compound having an isocyanuric acid ring represented by the following formula (1):

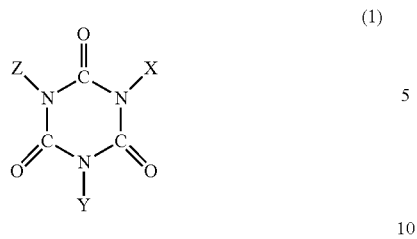

(1)

wherein
X is a group containing an epoxy ring,
Y is an atom of H, a group composed only of C and H, a group composed only of C, H and O containing no epoxy ring, or a group containing an epoxy ring, and
Z is an atom of H, a group composed only of C and H, or a group composed only of C, H and O containing no epoxy ring.

15. The sliding member according to claim 8, wherein the mixture further includes an epoxy compound having an isocyanuric acid ring represented by the formula (1) wherein each of X, Y and Z is a group containing an epoxy ring.

16. The sliding member according to claim 15, wherein the sliding member is a sliding bearing.

17. The sliding member according to claim 15, wherein the sliding bearing is a spherical bearing.

18. The sliding member according to claim 15, wherein the sliding member includes a head portion, a shaft portion, and a thread portion, and the self-lubricating liner is formed on an outer circumferential surface of the shaft portion.

* * * * *